Figure 15:
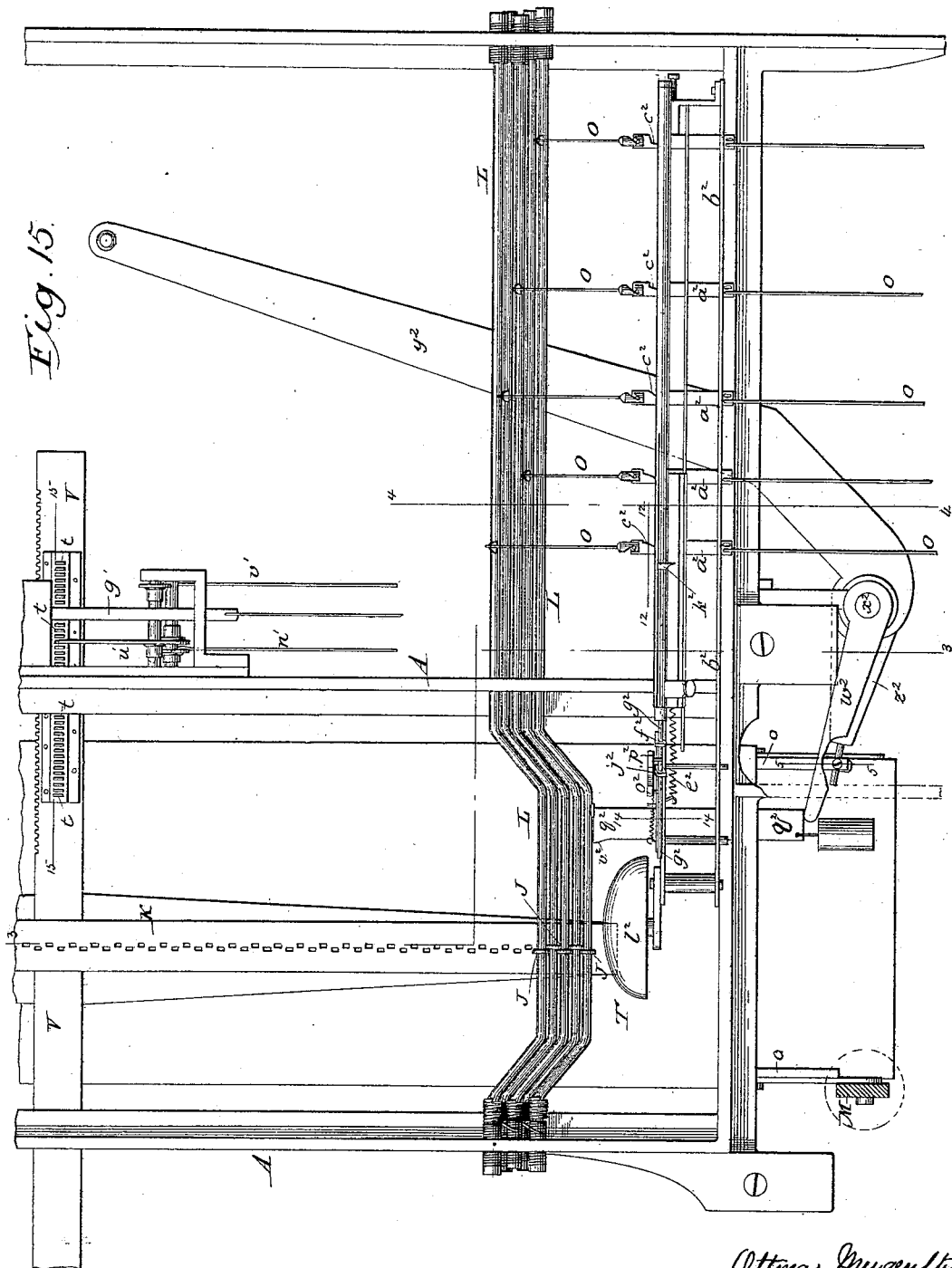

(No Model.)　　　　　　　　　　　　　　　　　17 Sheets—Sheet 1.
O. MERGENTHALER.
MACHINE FOR PRODUCING PRINTING BARS.
No. 313,224.　　　　　　　　　　　Patented Mar. 3, 1885.
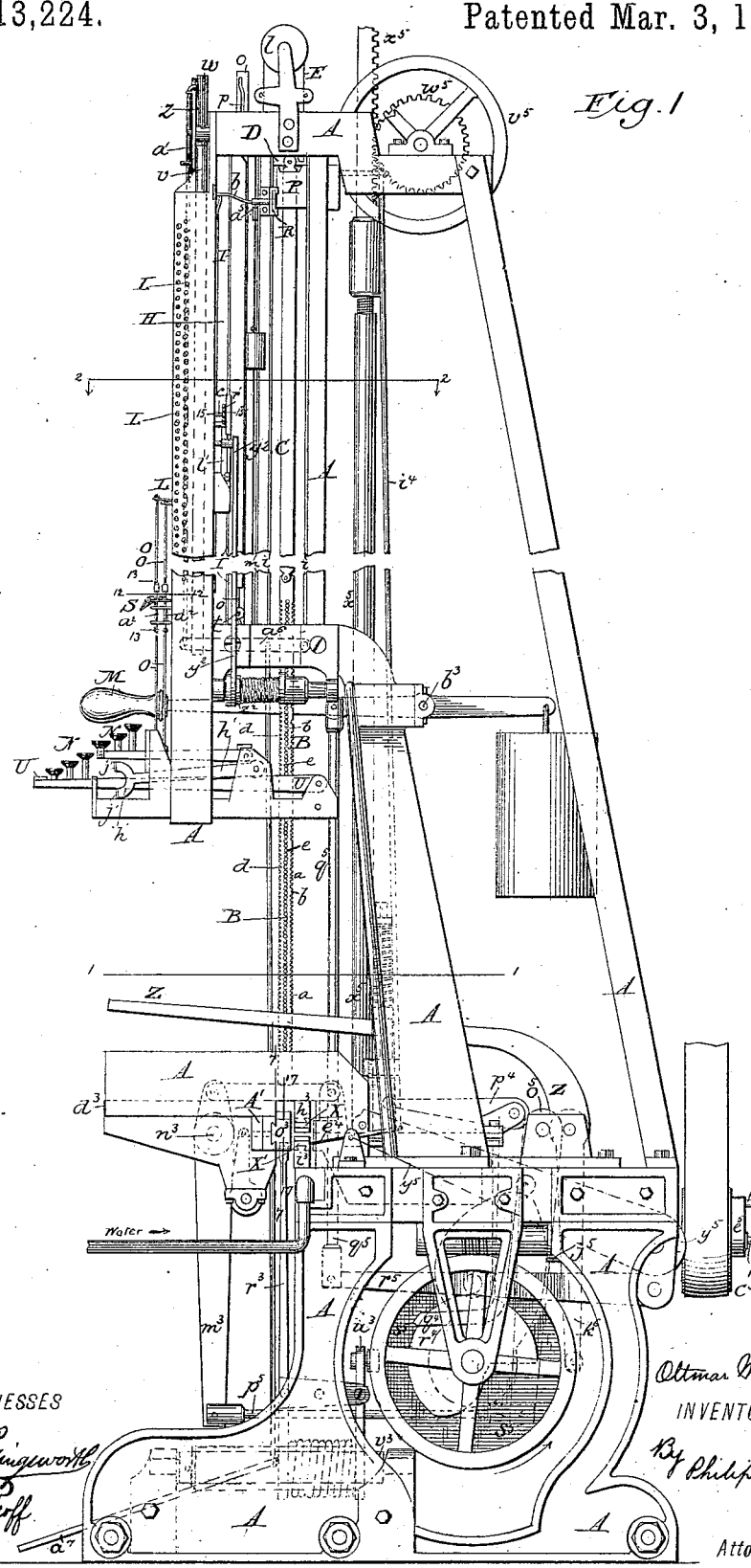
WITNESSES　　　　　　　　　　　　　　　　　INVENTOR

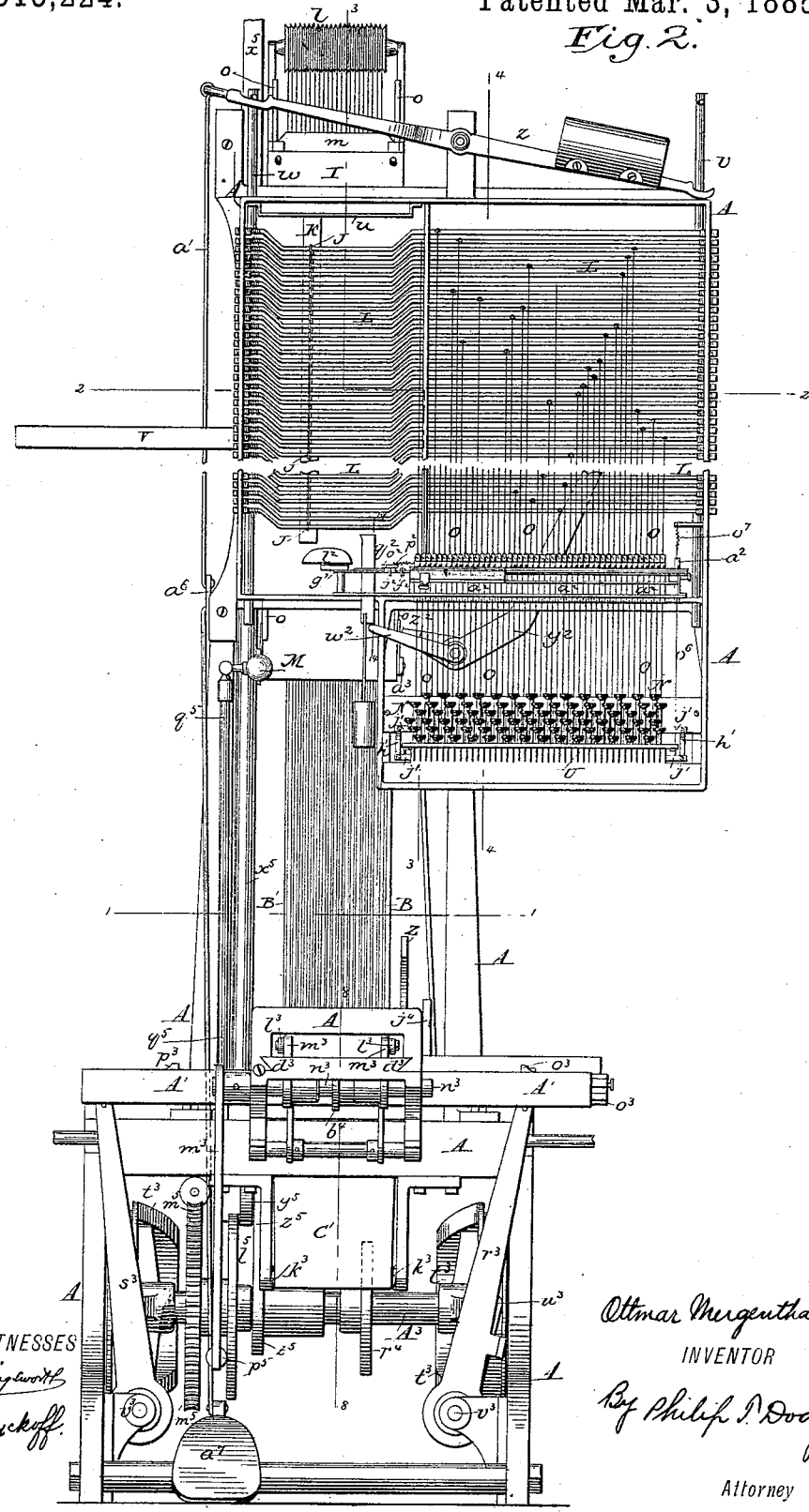

(No Model.)  17 Sheets—Sheet 3.
O. MERGENTHALER.
MACHINE FOR PRODUCING PRINTING BARS.
No. 313,224. Patented Mar. 3, 1885.
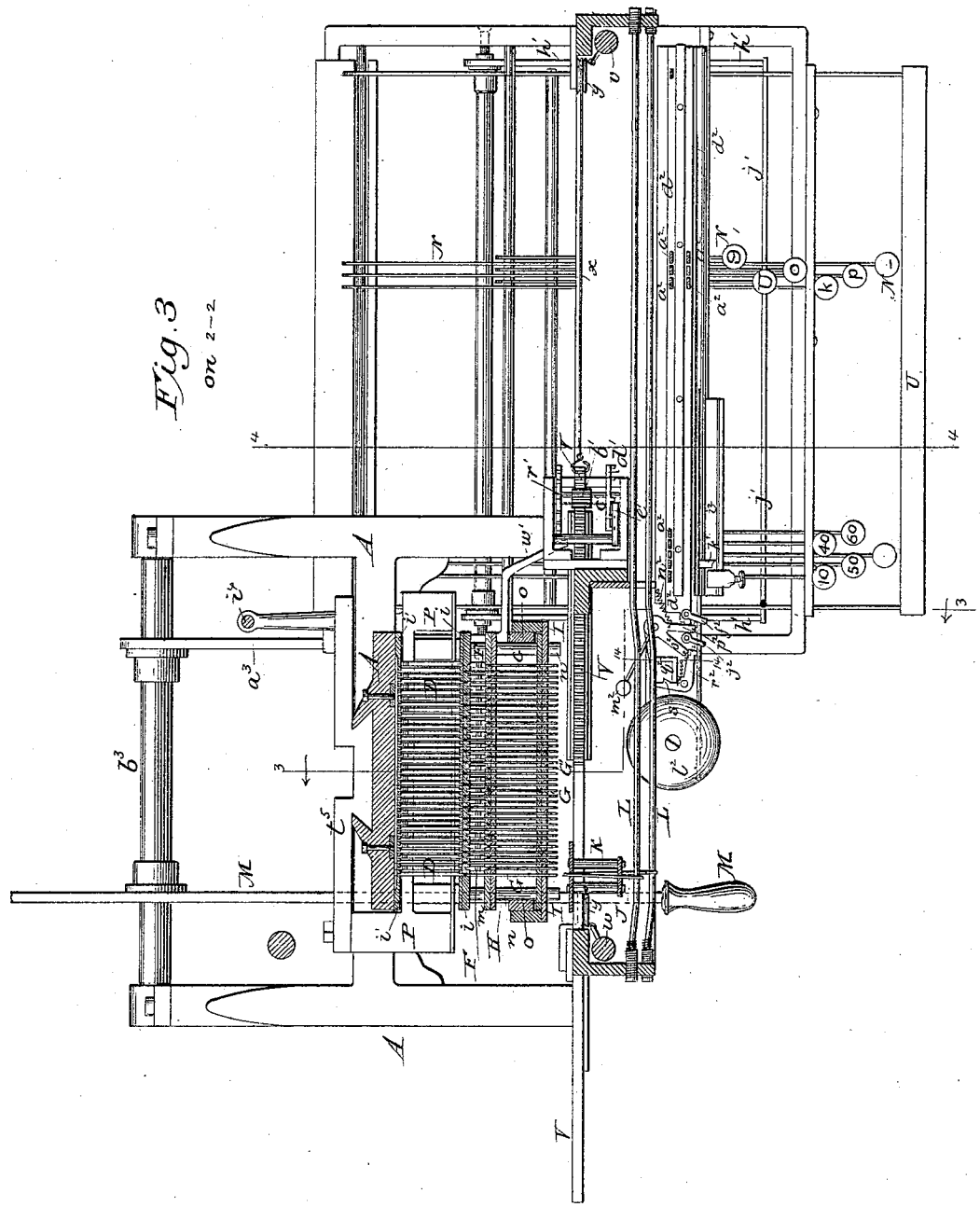
WITNESSES
Sidney P. Hollingsworth
Newton Wyckoff
Ottmar Mergenthaler
INVENTOR
By Philip T. Dodge
Attorney
N. PETERS, Photo-Lithographer, Washington, D. C.

(No Model.)　　　　　　　　　　　　　　　　　　17 Sheets—Sheet 4.
O. MERGENTHALER.
MACHINE FOR PRODUCING PRINTING BARS.
No. 313,224.　　　　　　　　　　Patented Mar. 3, 1885.
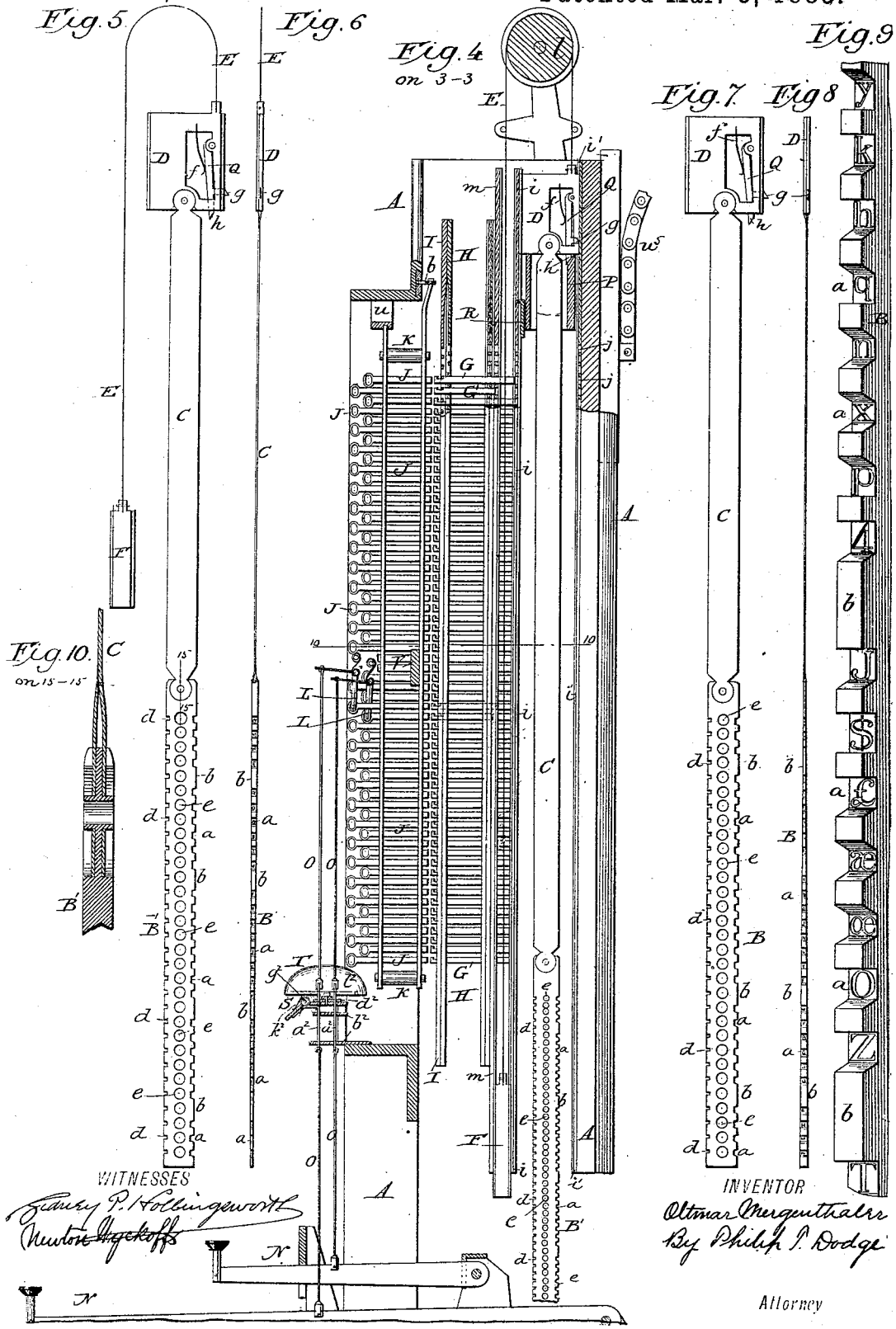

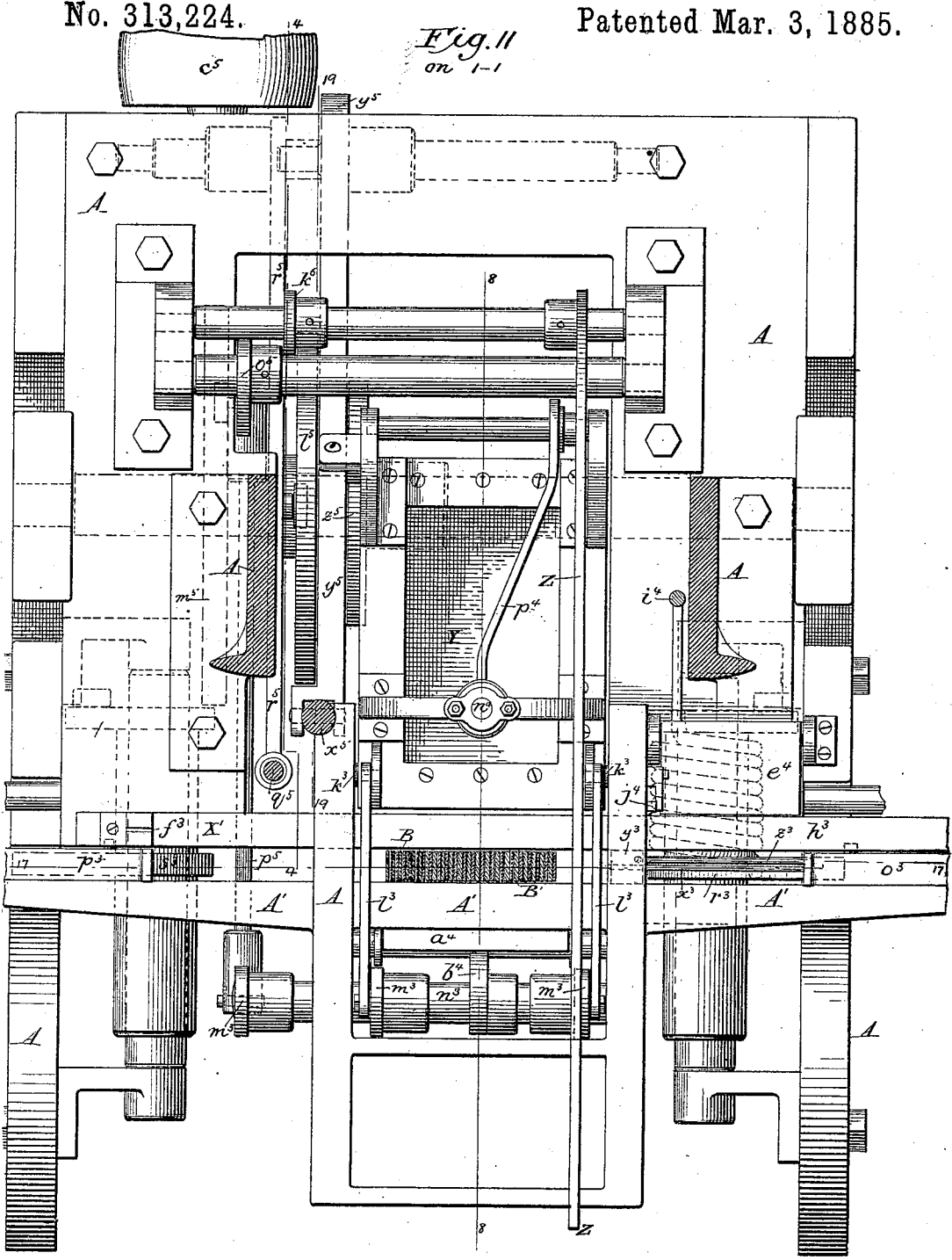

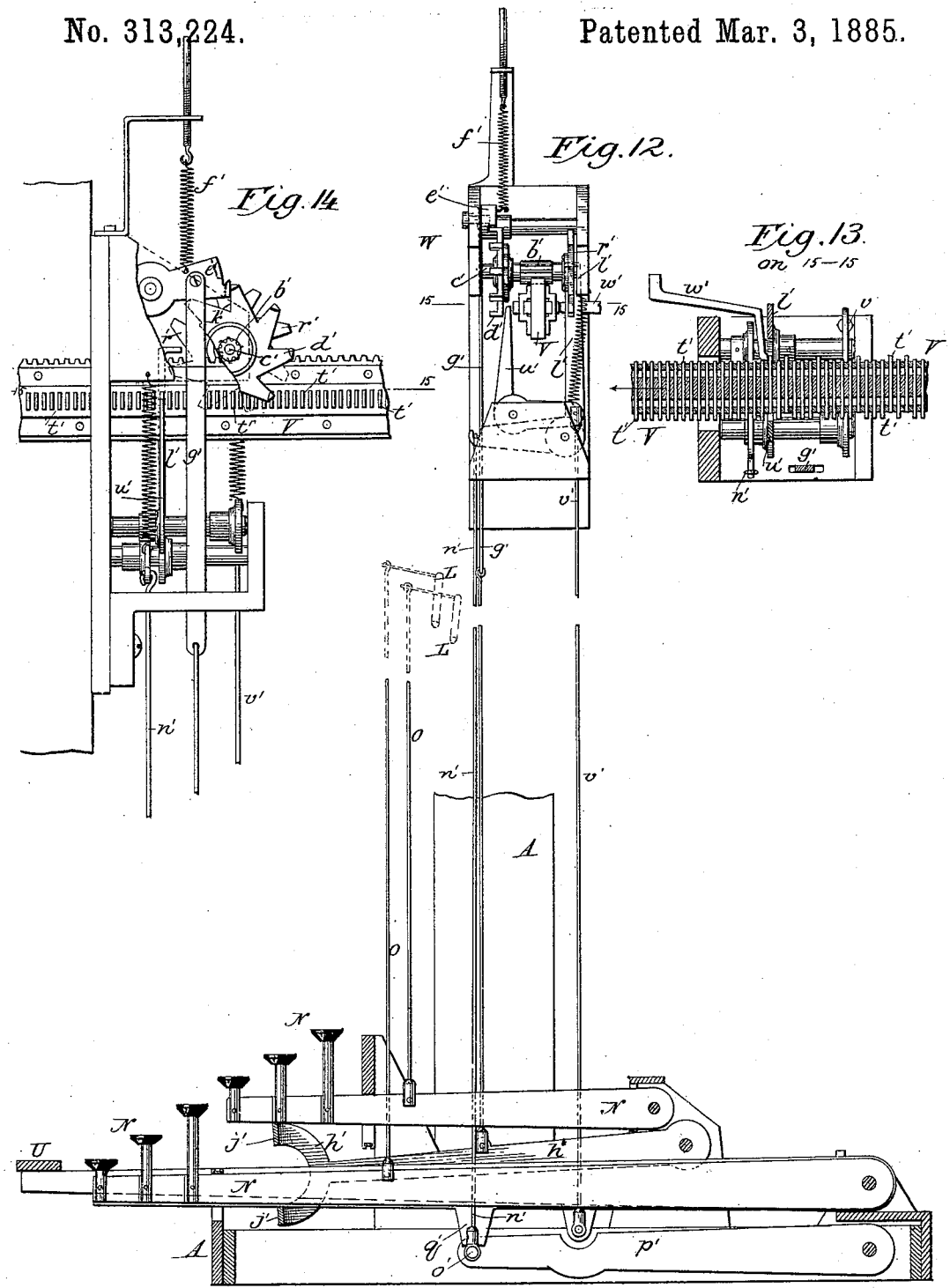

(No Model.)

17 Sheets—Sheet 7.

O. MERGENTHALER.
MACHINE FOR PRODUCING PRINTING BARS.

No. 313,224. Patented Mar. 3, 1885.

WITNESSES
Sidney P. Hollingsworth
Newton Wyckoff

Ottmar Mergenthaler
INVENTOR
By P. T. Dodge.
Attorney

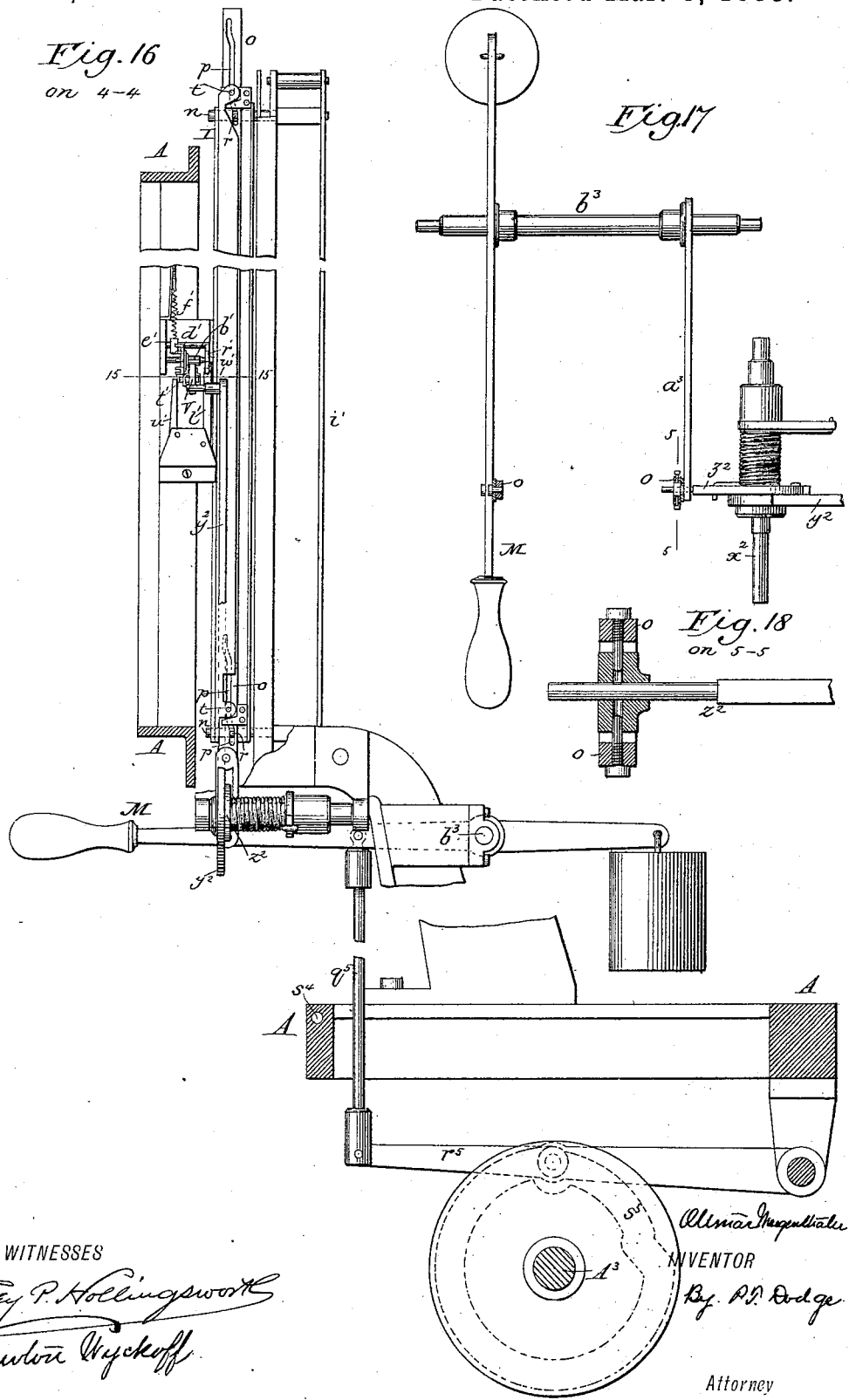

(No Model.)
17 Sheets—Sheet 9.
O. MERGENTHALER.
MACHINE FOR PRODUCING PRINTING BARS.
No. 313,224. Patented Mar. 3, 1885.
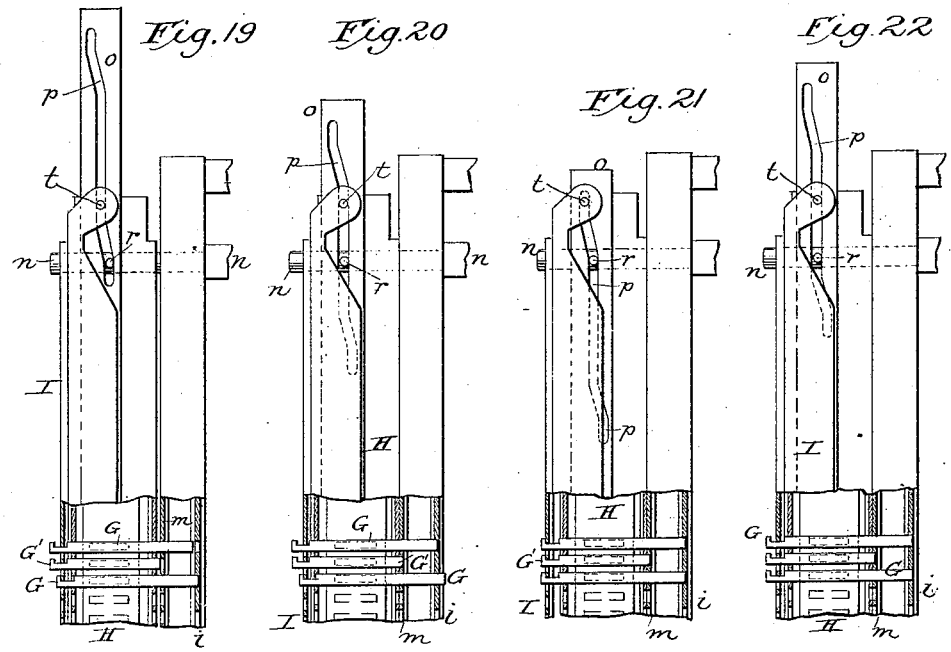
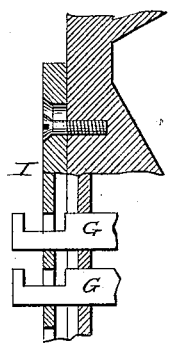
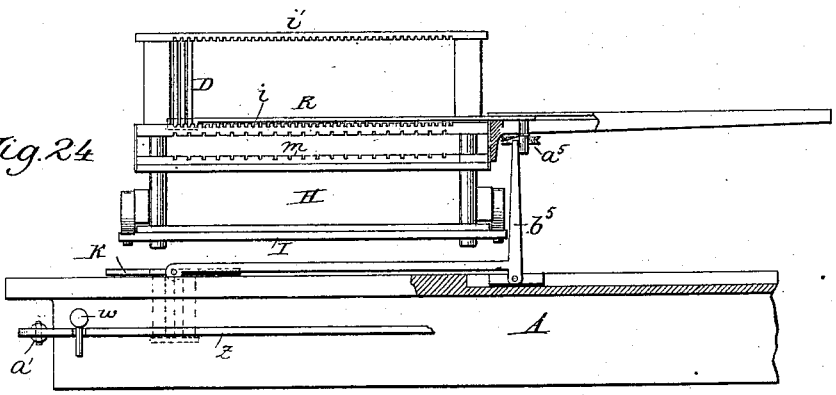
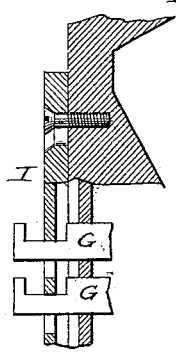
WITNESSES
INVENTOR
Ottmar Mergenthaler
By P. S. Dodge
Attorney

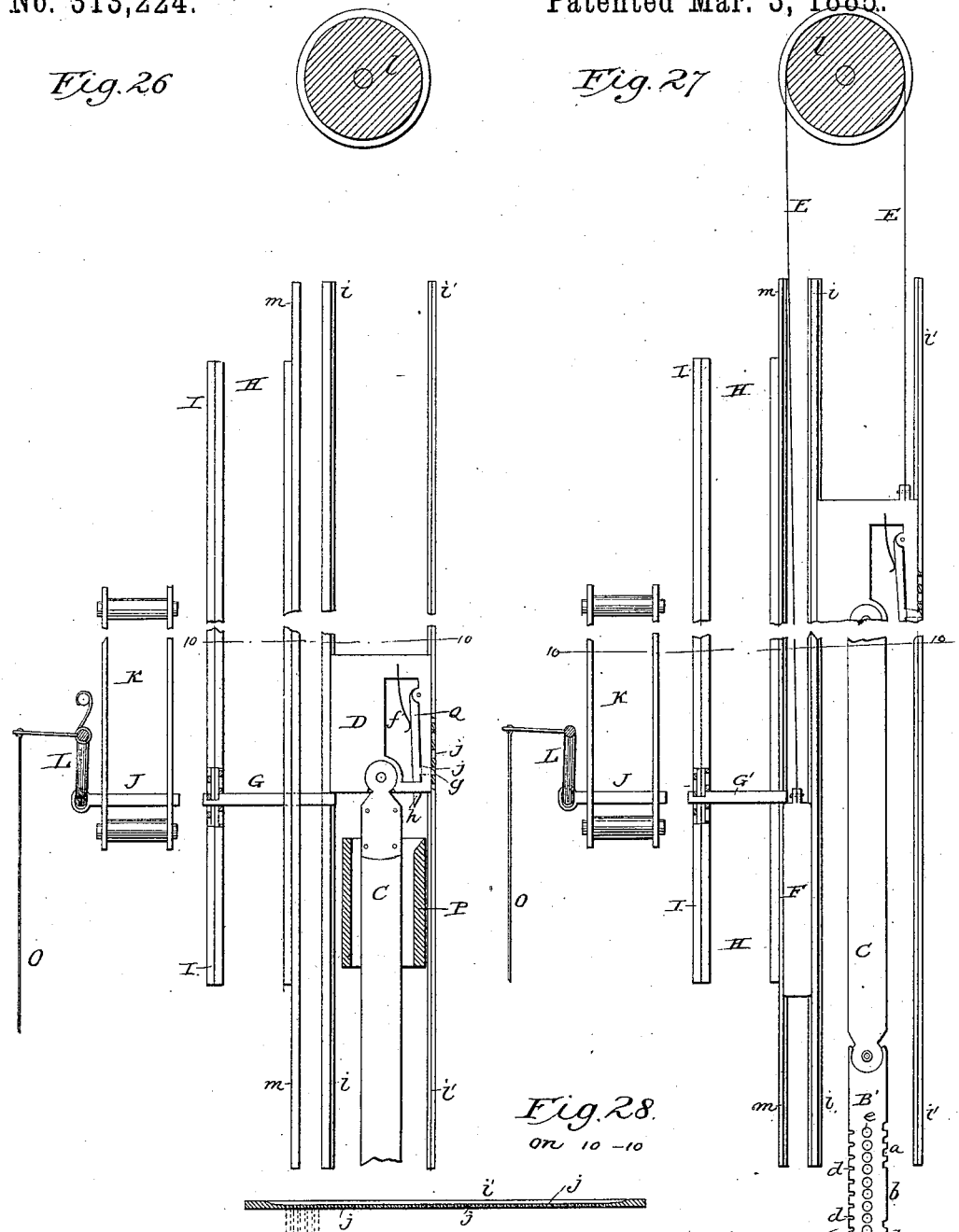

(No Model.)  17 Sheets—Sheet 11.
O. MERGENTHALER.
MACHINE FOR PRODUCING PRINTING BARS.
No. 313,224.  Patented Mar. 3, 1885.
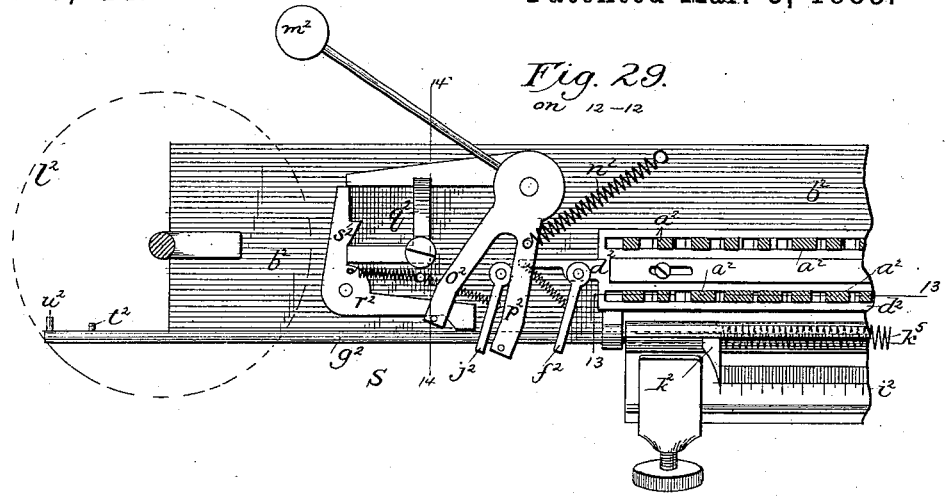
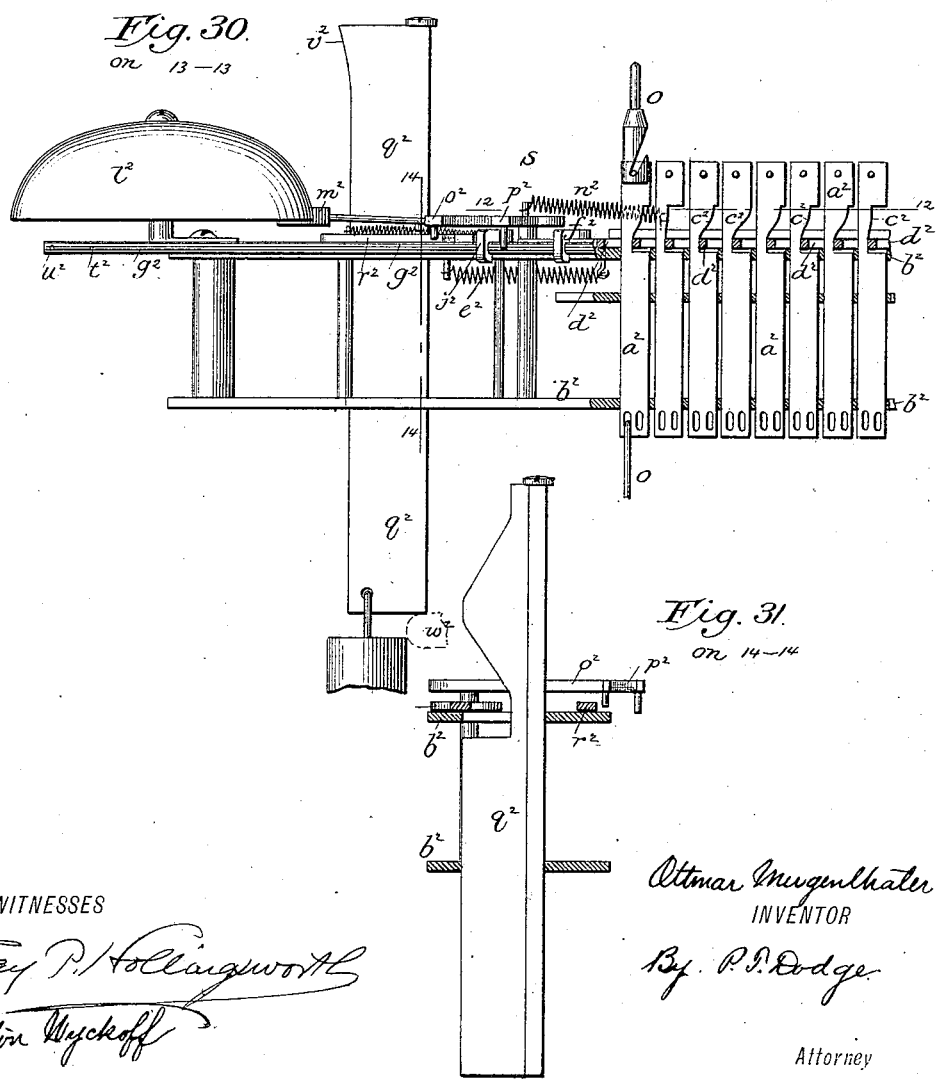

(No Model.) 17 Sheets—Sheet 12.
O. MERGENTHALER.
MACHINE FOR PRODUCING PRINTING BARS.
No. 313,224. Patented Mar. 3, 1885.
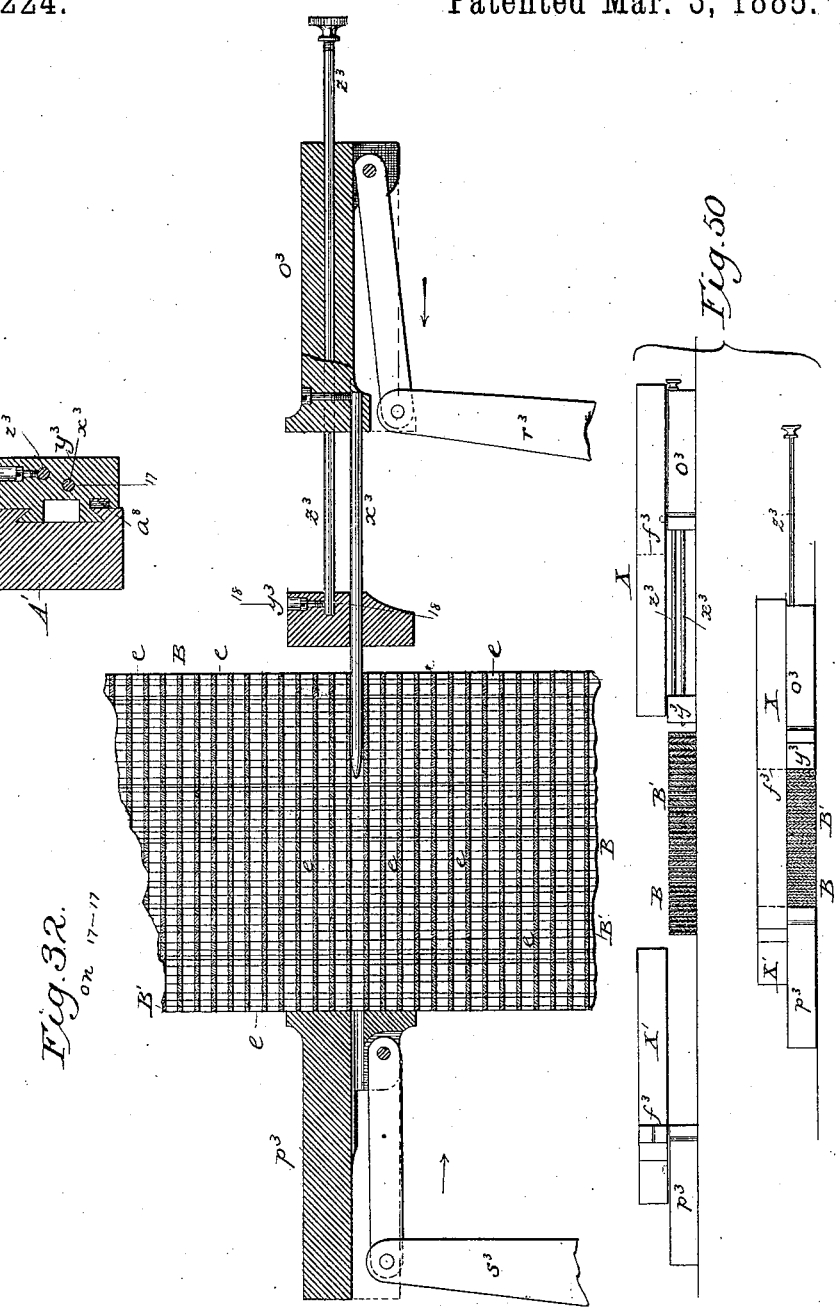
WITNESSES
INVENTOR
Ottmar Mergenthaler
By P. T. Dodge
Attorney (No Model.)
17 Sheets—Sheet 13.
O. MERGENTHALER.
MACHINE FOR PRODUCING PRINTING BARS.
No. 313,224. Patented Mar. 3, 1885.
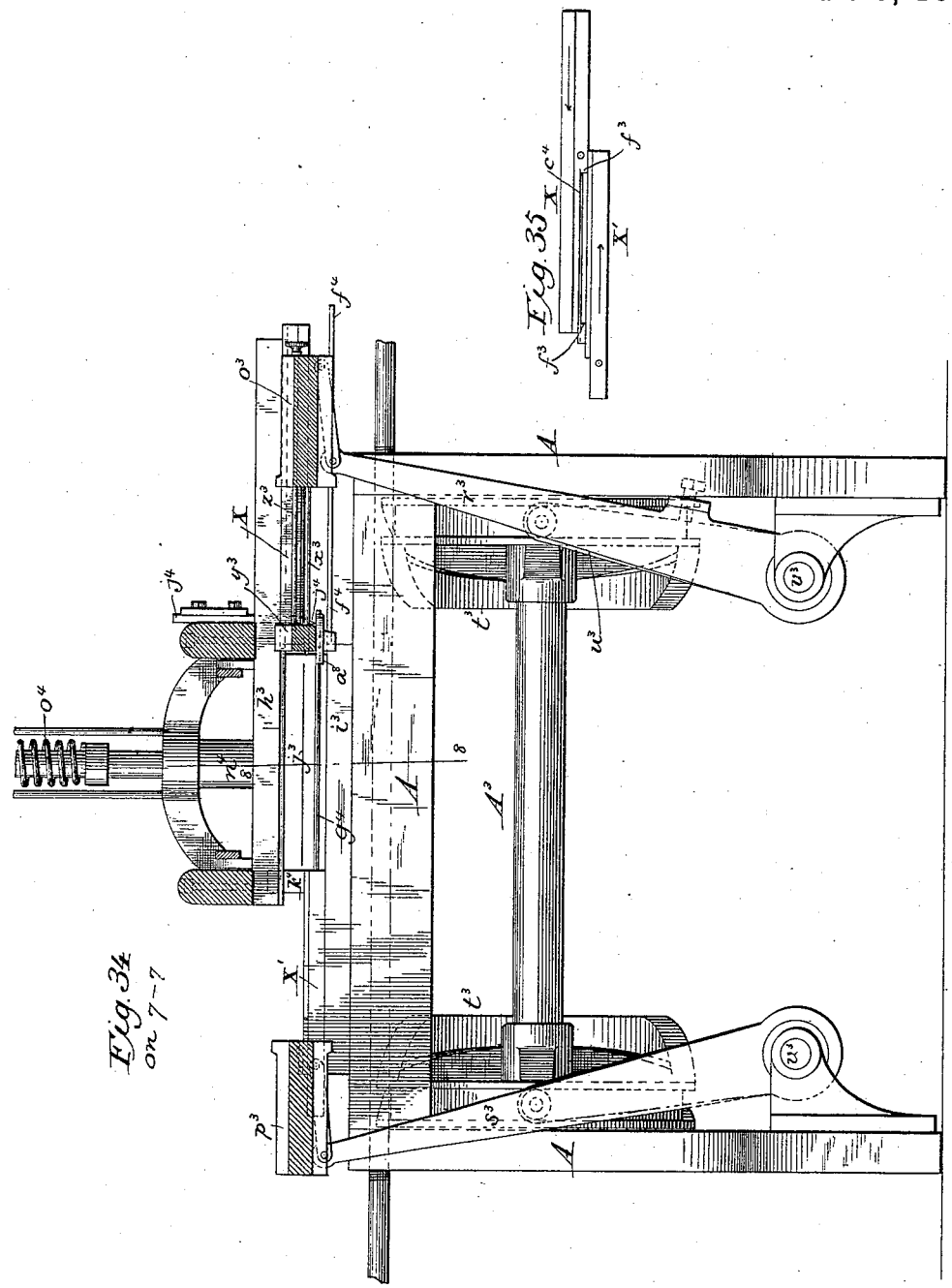
WITNESSES
INVENTOR
Ottmar Mergenthaler
By P. J. Dodge
Attorney (No Model.)
17 Sheets—Sheet 14.
O. MERGENTHALER.
MACHINE FOR PRODUCING PRINTING BARS.
No. 313,224. Patented Mar. 3, 1885.
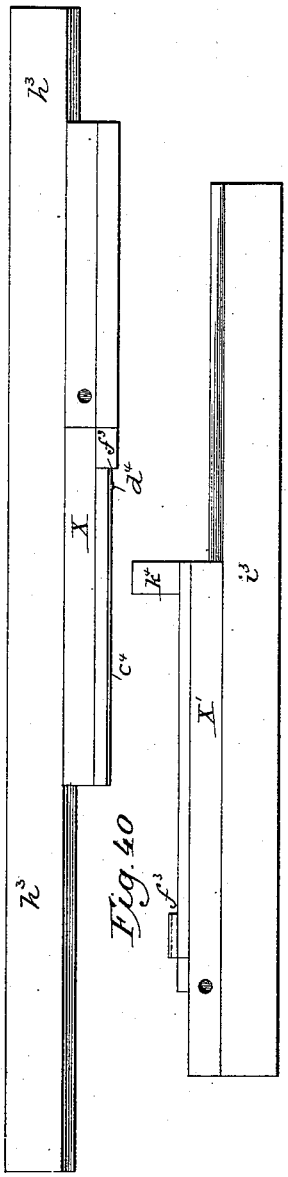
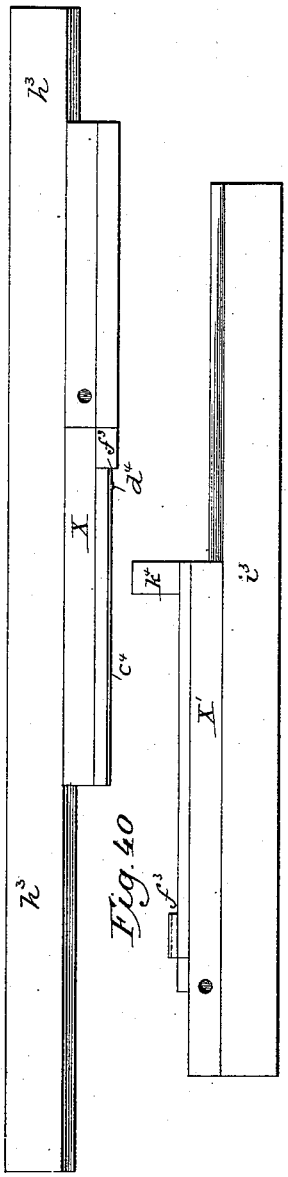
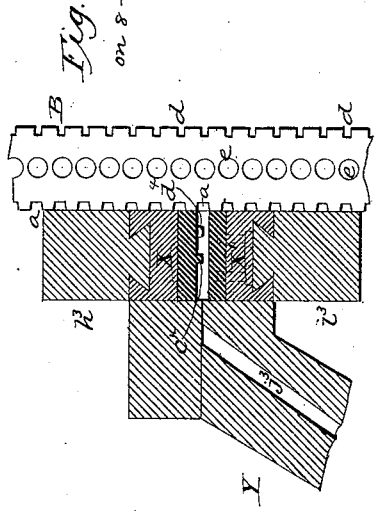
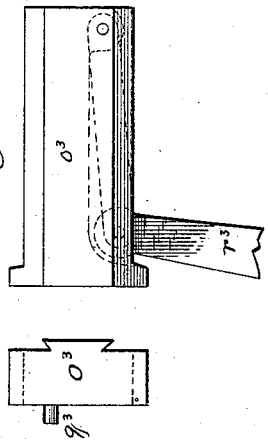
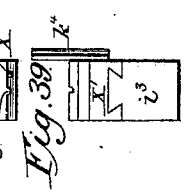
WITNESSES
Sidney P Hollingsworth
Newton Wyckoff
Ottmar Mergenthaler
INVENTOR
By P. T. Dodge
Attorney (No Model.)      17 Sheets—Sheet 15.

O. MERGENTHALER.
MACHINE FOR PRODUCING PRINTING BARS.

No. 313,224.      Patented Mar. 3, 1885.

WITNESSES

INVENTOR
Ottmar Mergenthaler
By P. T. Dodge
Attorney (No Model.)
17 Sheets—Sheet 16.
O. MERGENTHALER.
MACHINE FOR PRODUCING PRINTING BARS.
No. 313,224. Patented Mar. 3, 1885.
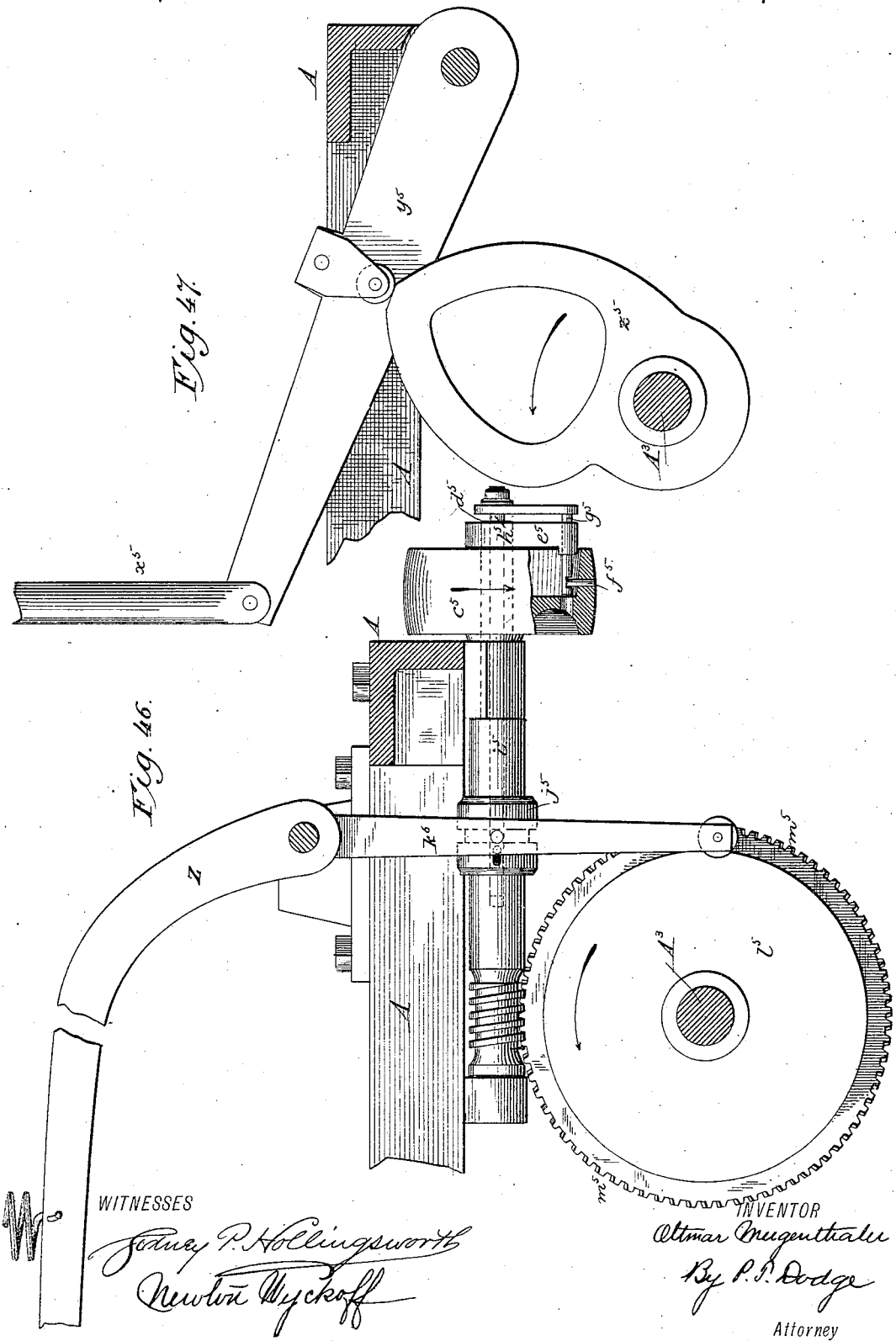
WITNESSES
INVENTOR
Ottmar Mergenthaler
By P. T. Dodge
Attorney

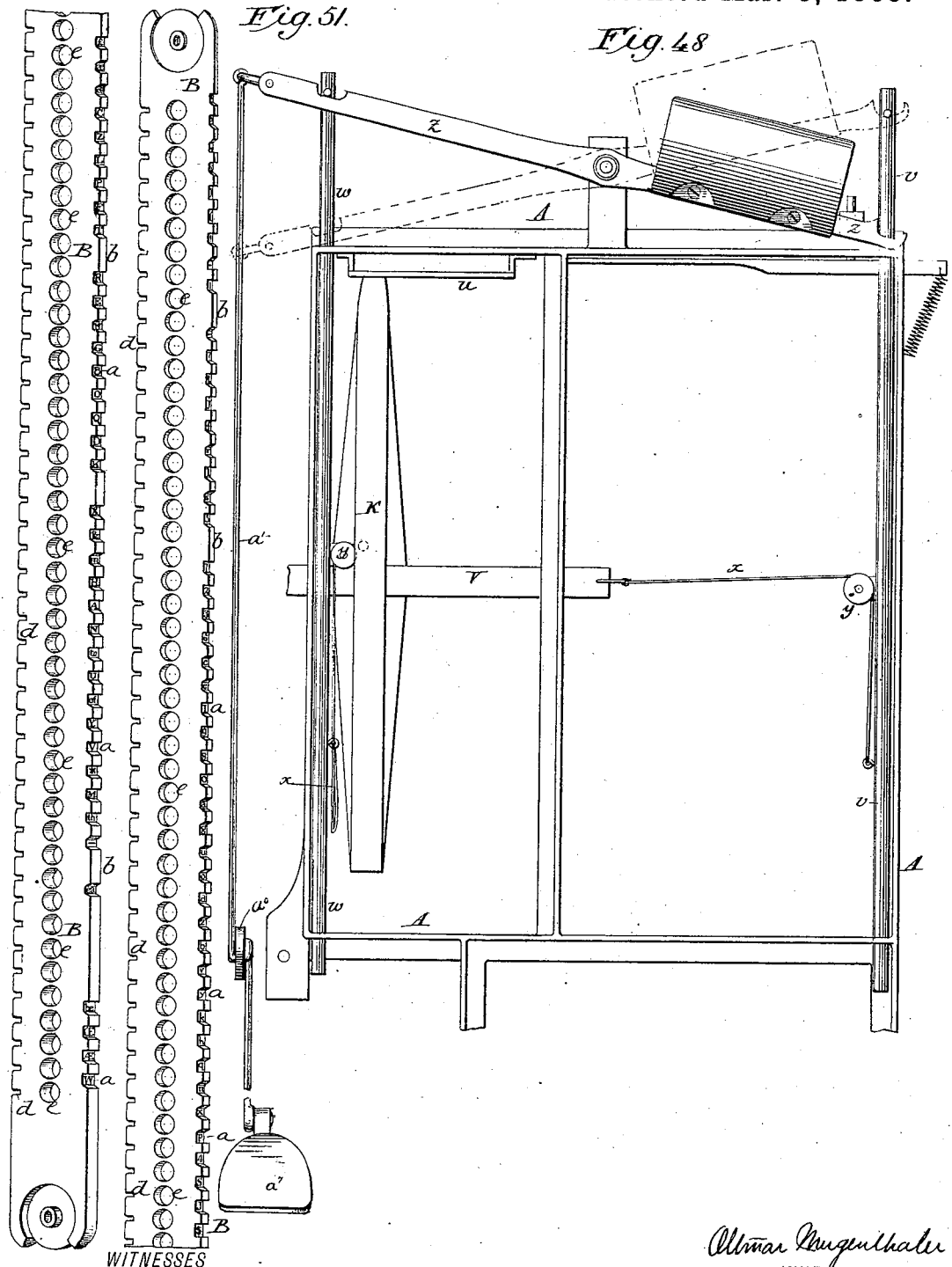

United States Patent Office.

OTTMAR MERGENTHALER, OF BALTIMORE, MARYLAND, ASSIGNOR TO THE NATIONAL TYPOGRAPHIC COMPANY, OF WEST VIRGINIA.

MACHINE FOR PRODUCING PRINTING-BARS.

SPECIFICATION forming part of Letters Patent No. 313,224, dated March 3, 1885.

Application filed August 30, 1884. (No model.)

*To all whom it may concern:*

Be it known that I, OTTMAR MERGENTHALER, of Baltimore, in the State of Maryland, have invented certain Improvements in Machines for Producing Printing-Bars, of which the following is a specification.

This invention is directed to the rapid and economical production of letter-press printing, and relates to a machine to be driven by power, and controlled by finger-keys, adapted to produce printing forms or relief surfaces ready for immediate use, thus avoiding the usual operation of type-setting, and also the more recent plan of preparing by machinery matrices from which to cast the forms.

By the use of my machine the operator is enabled to produce with great rapidity printing-bars bearing in relief the selected characters in the sequence and arrangement in which they are to be printed. In short, the machine will produce printing forms or surfaces properly justified, and adapted to be used in the same manner and with precisely the same results as the printing-forms composed of movable type.

My machine embraces two leading groups of mechanism: first, those which form a temporary and changing matrix representing a number of words; and, second, those by which molten or plastic material is delivered to the matrix and discharged therefrom in the form of printing-bars. These two groups, which will, for convenience of reference, be hereinafter designated as the "matrix mechanism" and the "casting mechanism," are so combined that the casting of one bar may be carried on while the characters are being designated and the devices adjusted to adapt the matrix for the production of the next bar, whereby time is economized and the capacity of the machine greatly increased. The matrix mechanism resembles in many respects the printing mechanism described and shown in my application for Letters Patent filed on the 9th day of July, 1884, No. 137,225, but differs therefrom, among other things, in having intaglio instead of cameo characters. The matrix mechanism embraces a series of parallel longitudinal bars or carriers, each containing at one edge a series of letters or characters, (one or more entire alphabets, if demanded,) and also blank portions representing spaces between the words. These bars are adjustable indepently so as to bring the selected characters, one on each bar, side by side in a single line, and so also as to bring the blank spaces of the appropriate bars between the groups of characters forming words, the series of bars thus adjusted presenting jointly a matrix adapted for the formation of a line of characters or words properly punctuated and justified. The bars are lifted mechanically to their normal position after the formation of each cast, and descending by gravity when released, are arrested, respectively, by stop-pins, at the different points required to bring the selected characters in a common line. The stop-pins, of which there is a vertical row for each printing-bar, are set for action by adjusting-pins which are in turn operated by the finger-keys. The adjusting-pins are mounted in a laterally-movable frame so as to be presented to the stop-pins of the various matrix-bars in succession, as in my previous machine. The stop-pins are mounted in a frame movable forward and backward, and combined with devices by which they are first moved backward, after being adjusted, in order to arrest the bars, and subsequently moved forward and restored to their original positions preparatory to the designation of the characters for another line. After the matrix-bars are stopped in their descent, a pin is thrust through holes in the entire series to bring the selected characters in approximate alignment, after which a transverse blade enters notches in the backs of the bars, and at the same time clamping devices act to close the bars together and confine them in the precise position desired, thus completing the temporary matrix. A sectional mold of the form of the required printing-bar closes adjacent to the matrix-bars with its open side in intimate contact therewith opposite the line of selected characters. A force-pump acting in connection with a melting-pot and heater delivers type-metal into the mold and matrix. As soon as the metal has become sufficiently hardened, the mold opens and the printing-bar is delivered therefrom. In due course the various parts assume their normal positions and again operate, as described, to complete the next bar.

While the casting of one bar is in progress, immediately after their descent, and while the matrix-bars are locked in their adjusted position, the stop-pins are disconnected from the bars and restored to their normal positions, so that the manipulation of the keys may be continued in the meanwhile to set the stop-pins for the arrest of the matrix-bars to produce the matrix for a second line, this action being also somewhat similar to that in my previous machine.

To permit the correction of errors caused by the striking of an improper key, means are provided for instantly restoring the adjusting-pins, stop-pins, and indicator to their primary positions, so that action may be commenced anew. The matrix-bars are tapered laterally from end to end, are arranged alternately with their wide and their narrow ends uppermost, and have the characters arranged thereon in the order of their width. At suitable intervals in the length of the bar, blank portions, before alluded to as spacing-surfaces, are provided, these surfaces varying in width according to their different locations upon the bar.

An indicating mechanism of novel character is provided, to show the space remaining to be filled in each line after all the characters allowable therein have been designated.

Special devices are provided to operate in connection with spacing-keys, so that a given space remaining to be filled at the end of a line may be taken up by causing those matrix-bars which have been designated to present blank spaces in the line to advance and present blank spaces of such width as may in each case be demanded. An alarm mechanism of improved form is also provided to give warning when a line is completely filled, and also a preliminary warning when there remains only a given space to be filled.

Figure 1 is a side elevation of my machine. Fig. 2 is a front elevation of the same. Fig. 3 is a horizontal section on the line 2 2 of the preceding figure, looking in a downward direction. Fig. 4 is a vertical section from front to rear on the line 3 3 of Fig. 3, showing particularly the key mechanism, the matrix-bars, and the intermediate devices by which the keys are caused to arrest the bars at the proper points. Figs. 5 and 6 are respectively a side view and a rear view of a matrix-bar having the wide end uppermost, and the devices for sustaining the same. Figs. 7 and 8 are similar views of a matrix-bar having its narrow end uppermost and its sustaining devices. Fig. 9 is a perspective view, on an enlarged scale, of a portion of one of the matrix-bars, showing the relative arrangement of the characters and the spacing-surfaces. Fig. 10 is a cross-section on the line 15 15 of Fig. 5, showing the construction of the joints by which the links for suspending the matrix-bars are united to said bars and to the supporting-heads.

Figure 45:
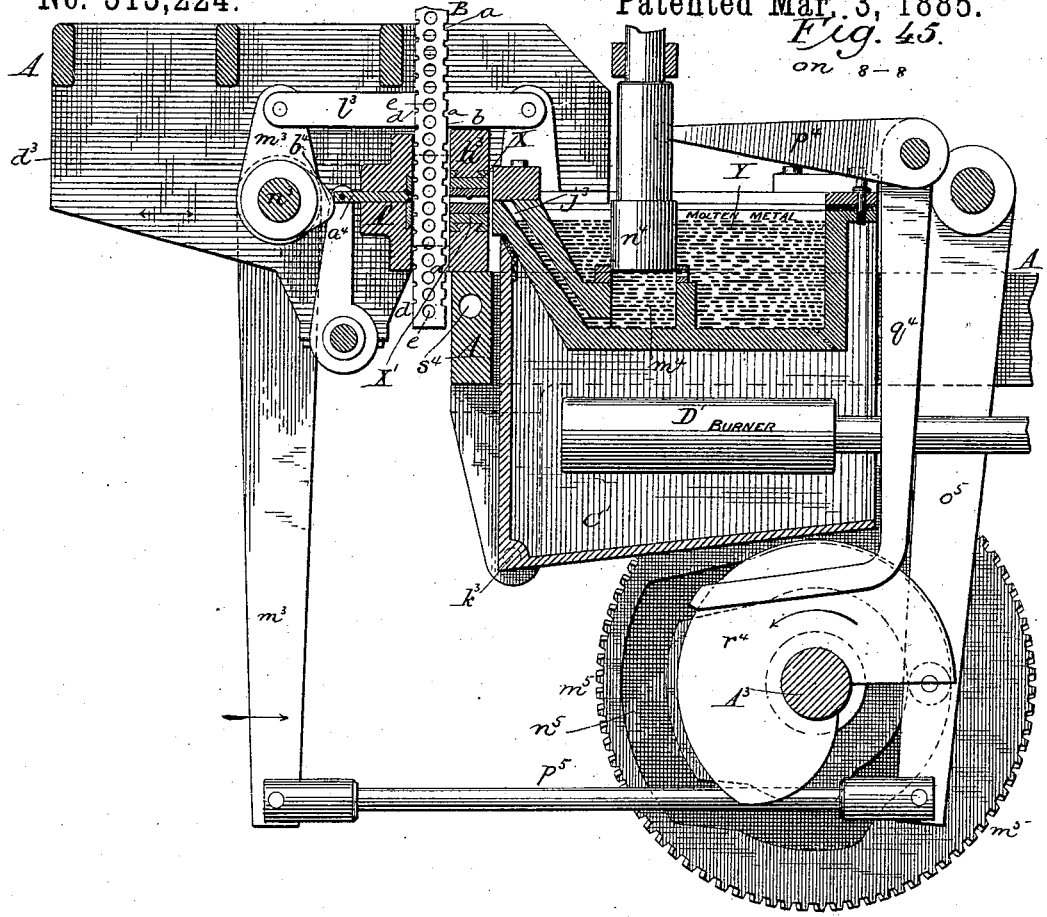
Figure 49:
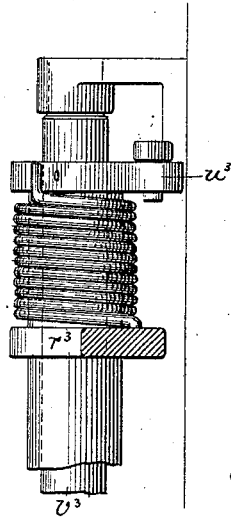

Fig. 11 is a horizontal section on the line 1 1 of Fig. 1, looking in a downward direction and showing particularly the mechanism for aligning and clamping the matrix-bars, and the arrangement of the casting apparatus. Fig. 12 is a vertical section on the line 4 4 of Fig. 3, showing the escapement and attendant devices by which the spacing or justification of the lines is effected after the selection of a suitable number of characters, various parts having no particular relation to those named being omitted. Fig. 12$^a$ is a front view of the spacing-keys and their connections with the ratchet mechanism. Fig. 13 is a horizontal section on the line 15 15 of Figs. 1, 12, and 14. Fig. 14 is a front elevation of the devices shown in the two preceding figures. Fig. 15 is a front elevation of the lower portion of the machine, showing the manner in which the keys are connected to the counting or indicating device, the frame carrying the adjusting-pins, and the devices for the correction of the spacing, other parts being omitted in order to avoid confusion. Fig. 16 is a side elevation, partly in section on the line 4 4 of Figs. 3 and 11, showing more especially the arrangement of the movable frame which carries the adjusting-pins and the escapement and its connections for correcting the spacing of the lines. Fig. 17 is a top plan view of the hand-lever and connections shown in the preceding figure, for the purpose of restoring the parts to their primary condition, in order to permit the correction of errors. Fig. 18 is a cross-section on the line 5 5 of the preceding figure. Figs. 19, 20, 21, and 22 are elevations, partly in section, showing the frame in which the stop-pins are sustained and the devices employed for shifting the same to secure the necessary action and restoration of the pins, the respective views showing the parts in the different positions which they assume from time to time. Figs. 23 and 24 are vertical sections through the top of the adjusting-pin frame from front to rear, illustrating the manner in which the retracting devices engage the pins. Fig. 25 is a top plan view showing the notches in which the matrix-bars are mounted, the adjusting-pin frame, and the bar by which those matrix-bars which are not called into action are prevented from descending. Fig. 26 is a diagram in the nature of a vertical section from front to rear, showing the action of the adjusting-pins and stop-pins to arrest the descent of those matrix-bars which have their small ends uppermost. Fig. 27 is a similar view showing the bars which have their large ends uppermost. Fig. 28 is a horizontal cross-section on the line 10 10 of the two preceding figures and of Fig. 4, showing particularly the long and short stop-pins to arrest, respectively, the bars having the narrow end uppermost and the bars having the wide end uppermost. Fig. 29 is a horizontal section on the line 12 12 of Figs. 1, 15, and 30, showing the details of the counting and the alarm devices. Fig. 30 is a front elevation of the same with a portion shown in vertical section on the line 13 13. Fig. 31 is a vertical section from front to rear on the line 14 14 of Fig. 29. Fig. 32 is a vertical cross-section on the line 17 17 of Figs. 1, 11 and 33, showing the devices for effecting the preliminary alignment of the matrix-bars and for clamping said bars together laterally. Fig. 33 is a cross-section on the line 18 18 of the preceding figure. Fig. 34 is a vertical cross-section on the line 7 7 of Figs. 1 and 11, illustrating more particularly the construction and operation of the separable mold, the devices for opening and closing the same, and the location of the devices by which the molten metal is forcibly delivered into the mold. Fig. 35 is a front elevation of the mold proper. Fig. 36 is an end elevation of the upper portion of the mold and the guide on which it slides. Fig. 37 is an under face view of the same. Fig. 38 is a side elevation of the same looking in the direction indicated by the arrow in Fig. 36. Fig. 39 is an end elevation of the lower portion of the mold and its guide. Figs. 40 and 41 are respectively a front elevation and a top plan view of the same. Figs. 42 and 43 are respectively an end view and a side elevation of one of the clamps, by which the lateral pressure is applied to the matrix-bars. Fig. 44 is a vertical cross-section from front to rear on the line 8 8 of Figs. 11 and 34, showing the relative positions of the mold and the matrix-bars and the conductor for supplying the molten metal to the mold, the parts being in the position which they occupy during the casting of the printing-bar. Fig. 45 is a vertical section from front to rear through the base portion of the machine on the line 8 8 of Figs. 11 and 34, showing more fully the arrangement of the matrix-bars, the aligning and clamping devices, the mold, and the pump for delivering the metal to the mold. Fig. 46 is an elevation, partly in section, on the line 19 19 of Fig. 11, showing the clutch mechanism through which motion is communicated to the operative parts, and the hand-lever by which the action of the clutch is inaugurated. Fig. 47 is an elevation of the cam and lever, by which the raising and lowering of the matrix-bars is effected. Fig. 48 is a front view of part of the main frame, showing the shifting weights. Fig. 49 is a top view of the clamp-operating levers, showing the yielding devices. Fig. 50 is a top plan view of the clamps and mold in an open and in a closed position. Fig. 51 is a perspective view of a matrix-bar in two parts.

*Principal parts.*—Referring to the drawings, A represents the rigid main frame, which may be of any suitable form; B B', the vertically-reciprocating matrix-bars; C, the suspending links for said bars; D, the heads from which the links are suspended; E, suspending chains or bands passing from the heads of the alternate matrix-bars, which have their wide ends uppermost, over pulleys and downward to slides F; G G', the stop-pins to arrest the movement of the matrix-bars; H, the frame in which the stop-pins are mounted, movable forward and backward; I, the plate to retract the stop-pins; J, the adjusting-pins to act on the stop-pins; K, the laterally-movable frame in which the adjusting-pins are carried; L, the horizontal crank-shafts to actuate the adjusting-pins; N, the finger-keys; O, rods connecting the keys and rock-shafts; P, the vertically-sliding head to raise the matrix-bars to their normal positions; Q, dogs to sustain the matrix-bars when released from the stop-pins and lifting-heads; R, a horizontal slide to sustain those matrix-bars which are not called into action; S, the counter or indicator; T, the alarm; U, the finger-key for ordinary spacing; V, a bar provided with slides to effect additional spacing or justification; X X', the mold; Y, the melting-pot; Z, the lever by which the automatic mechanisms are set in motion.

*Matrix-bars.*—In proceeding to construct my machine I first provide as fundamental elements the series of matrix-bars B B', the number of which should equal the maximum number of characters and spaces to appear on any one printing-bar. These matrix-bars consist each of a metal strip tapered laterally from one end to the other, and provided in one edge with the series of recessed or intaglio characters $a$, and also with one or more blank spacing-surfaces, $b$. It is preferred to provide the bars, as shown in Figs. 6 to 10, with transverse grooves or recesses, and to locate the characters in the bottoms of these recesses; but the characters may be formed directly in the edge of the bar. There may be any desired number of characters in each bar—for example, one or more complete alphabets, together with the numerals, punctuation-marks, and symbols in common use. The characters are disposed in a single column lengthwise of the bar, and in position to be read transversely thereof, as shown, this arrangement permitting single characters on adjacent bars to be assembled in position to read as a single line. The characters are arranged in the bar in the order of their width, the narrowest characters at the thin end, so that each occupies substantially the entire width of the bar at the point where it is located. This construction permits any character of any bar to be brought in close relation to any character on an adjoining bar, and thus secures the proper width and uniformity of spacing between characters in the same word. The intermediate spacing-surfaces are also arranged in the order of their width, so that any bar may be caused to present a wide or a narrow space at the aligning point as occasion may demand. The distribution of the spacing-surfaces between the characters is of importance, in that it permits the spaces to be made of the various widths demanded without destroying the uniformity in the taper of the bars, which would prevent the bars from being closed tightly together under all adjustments at the aligning point. When the spaces are arranged as shown, the bars may, under every adjustment demanded, be closed together so tightly as to prevent the passage of the molten metal between them. Inasmuch as the lower-case letters are of different lengths or heights, and extend above and below the lines different distances, it is found advisable to give the recesses or notches in which they are located different forms, as plainly represented in Fig. 9. The bars are divided into imaginary spaces of equal length, allotted one to each letter. Those letters which are located wholly above the line, and which extend upward the minimum distance—such as a, c, e, o, s, &c.—have the walls or edges of their recesses beveled backward, as plainly shown. Those letters which have stems extending upward above the line a maximum distance—such as b, d, h, &c.—have the upper walls of their recesses perpendicular to the edge of the bar, while the lower walls are beveled, as shown. Those letters which extend below the line the maximum distance—as, for example, p, q, &c.—have the lower walls of their recesses vertical, while the upper walls are inclined. This construction is adopted to reduce the width of the printing-bar adjacent to the characters, and to prevent the formation upon the printing-bars of raised surfaces which would be liable to receive and give off ink at improper points. It is also advantageous in that it permits the printing-bar to be the more readily detached from the matrix. The matrix-bars are divided into two groups or sets, B and B'. The bars of the first group are arranged with their narrow ends uppermost, while the bars of the second group are arranged with their wide ends uppermost, as plainly represented in Figs. 5 to 8, the bars of the two forms being alternated throughout the series, when assembled in the machine, for reasons which will hereinafter fully appear. The fact that the bars of one group have their wide ends uppermost, while the others have their narrow ends uppermost, necessitates a corresponding difference in the arrangement or sequence of the characters thereon, the letter W, for example, appearing at the lower end of the bars B, but at the upper end of the bars B'. Each matrix-bar is provided in the rear edge with a series of transverse notches, $d$, one for each character, and is also provided in the middle with a corresponding series of perforations, $e$, these notches and perforations being designed to co-operate with the devices by which the bars are aligned and held during the casting operation.

Having provided the series of matrix-bars, I pivot each at its upper end to a metal link, C, which is in turn jointed at its upper extremity to a supporting head or plate, D, designed to slide in suitable guides, and provided on one side with a dog, Q. This dog is pivoted at its upper end and urged outward by a spring, $f$. At its lower end it has a rearwardly-extending finger, $g$, and a downwardly-extending finger, $h$, each of which is beveled or inclined at the extremity. To those heads D from which the matrix-bars B' are suspended I connect flexible chains or bands E, the opposite ends of which are secured permanently to slides F.

*Matrix-bar connections.*—Having provided the matrix-bars as above, I arrange them side by side in a vertical position, first a bar with the wide end uppermost, next a bar with the narrow end uppermost, and so on throughout the series. The heads D from which the bars are suspended I arrange to slide at their edges in parallel vertical grooves formed in the faces of two guide-plates, $i$ and $i'$, which are fixed permanently in position in the main frame, as represented in Figs. 1, 3, 4, 25, 26, and 27, the arrangement being such that the bars may rise and fall independently of each other. The rear guiding-plate, $i'$, is provided, as plainly shown in the several figures, with notches or shoulders $j$, to engage with the dogs Q on the sliding heads, so that whenever the dog is permitted to operate it will act to sustain the sliding head and its matrix-bar at the elevation in which they may chance to be at the moment.

Between the guide-plates $i$ $i'$, I locate a lifting head or yoke, P, which is arranged to slide vertically, and which loosely encircles the upper ends of the entire series of sustaining-links C in such manner as to engage beneath and support their heads D. The lifting-head thus applied serves as a means of temporarily sustaining the entire series of matrix-bars, and of lifting them, after the casting operation, to their normal positions.

On reference to Fig. 4 it will be observed that the upper rear edge of the lifting-head P is beveled or inclined to engage the lower ends of the dogs Q, which are thus held out of action so as to permit the heads and matrix-bars to rise and fall freely with the lifting-head, so long as they are supported thereon. When, however, the descent of any head D is arrested by the stop-pins, as hereinafter described, the lifting-head P, descending from the dog Q, will release the latter, so that it may immediately engage the plate $i'$ to prevent the farther descent of the matrix-bar in the manner represented in Fig. 26. The matrix-bars B, having the narrow ends upward, have no connection above their heads D, but the heads of the intermediate matrix-bars B' have their bands or chains E carried upward over stationary guide-rolls 1, and thence downward to their slides F, which are arranged to travel in vertical grooves formed in the opposing faces of guide-plates $m$ and $i$, fixed vertically in position in the main frame, as represented in Figs. 3 and 25. The descent of either bar B' causes a corresponding ascent of its slide F, and vice versa. These slides are employed in connection with the alternate matrix-bars to engage their stop-pins for the purpose of arresting the motion of the bars at the proper points, and are necessary in order to permit the use of one set of keys and adjusting-pins in connection with the two forms of matrix-bar, which, it will be perceived, by reason of the different arrangement of their characters, require to be stopped at different heights in order to present a common letter at the printing-point, as will hereinafter more fully appear.

*Stop-pin mechanism.*—For the purpose of arresting the descent of the matrix-bars at the proper points to present their selected characters in position for use, I employ horizontally-sliding stop-pins G and G', the former to stop the bars B and the latter to stop the intermediate bars B'. The pins are arranged in horizontal and vertical rows. The pins in each horizontal row represent the same letter of the different matrix-bars, while those in each vertical row represent the different characters and spaces of the same bar. The pins G are made of such length that they may be projected beneath the heads D of the bars B, in order that they may stop said heads by direct engagement therewith. The pins G' on the other hand are made shorter so as to engage and arrest the ascent of the slides F, and thereby control the descent of the bars B' indirectly through the bands E. This arrangement permits all of the stop-pins which represent a given letter to be placed in line horizontally, so as to be acted upon by a single adjusting-pin, J, as the latter is moved laterally from one to another. Were it not for the employment of the bands E and the slides F, the stop-pins of the bars B would require to be located at a different elevation from the stop-pins representing like letters on the bars B', and consequently it would be impossible to employ a single series of adjusting-pins to present the same letter on the bars B and B'. The entire series of stop-pins is mounted in a vertical frame, H, adapted to be moved horizontally forward and backward by means hereinafter explained in detail.

*Adjusting-pins and connections.*—In front of the series of stop-pins I arrange the horizontal adjusting-pins J, of which there is a single series arranged in a vertical line or column in a frame, K, which is movable horizontally to and fro, so that the adjusting-pins may be presented first in front of the stop-pins of the several matrix-bars in succession from left to right throughout the series, as in my original machine. The adjusting-pins have their forward ends slotted vertically and mounted on crank-shafts L, which are sustained in bearings in the main frame and rocked by means of rods O, extending from arms thereon downward to finger-keys N, arranged in a bank or group at the front of the machine. The depression of any finger-key is followed by the operation of the corresponding crank, which in turn forces backward its adjusting-pin J, causing the latter to force rearward one of the stop-pins. By means of an escapement mechanism, hereinafter described, the depression of each key is caused to advance the frame which carries the adjusting-pins step by step from the left toward the right. At the depression of the first key, the adjusting-pin operated thereby, standing in the position represented in Fig. 3, acts upon one of the stop-pins of the first matrix-bar. As the finger-key rises, the escapement permits the adjusting-pin frame K to move to the right, so that at the action of the second key the adjusting-pin operated thereby actuates a stop-pin of the second matrix-bar, and so on repeatedly, the result being that after a suitable number of keys have been operated, stop-pins will be adjusted to arrest the motion of all the matrix-bars—one pin for each bar.

*Stop-pin frame.*—For reasons which will hereinafter appear, it is not permissible to have the stop-pins moved at once into position to arrest the bars. After being designated and adjusted by the manipulation of the keys, they are moved backward in position to arrest the matrix-bars by a rearward movement of their supporting-frame H. This motion of the frame carries all the pins backward; but as those which were adjusted by the keys project beyond their companions, they alone are placed in position to engage the heads D and slides F to stop the matrix-bars. After the entire series of matrix-bars has been stopped, and the bars are sustained by their dogs Q, the stop-pins are disengaged and restored to their normal positions. This is accomplished by means of the horizontally-movable plate I, which is perforated to receive and engage with the notched or shouldered ends of the stop-pins, in the manner represented in Figs. 3, 24, 26, 27, &c. This plate first moves backward independently from the frame H, in which the stop-pins are mounted, and thus draws the entire series of pins backward in the frame, after which the frame and plate both move away from the matrix-bars, carrying the stop-pins to a position in which it is impossible for them to effect the stoppage of the bars, this being the position in which they stand at the time the operation of the finger-keys is commenced. After the proper keys have been manipulated and the proper stop-pins projected rearward, as shown in Fig. 28, the entire pin-frame again moves to the rear, as before, in order to present the adjusted pins in position to effect the stoppage of the bars.

The means by which the movements of the stop-pin frame and the retracting-plate are secured will be readily understood on reference to Figs. 2, 16, and 19 to 24. The frame H, in which the pins are mounted, is sustained and arranged to slide forward and backward on four horizontal pins, $n$, extending through its corners and fixed rigidly to the main frame. An upright rectangular frame, $o$, encircles the frame H, and slides closely in vertical grooves in its sides. This vertically-sliding frame $o$ is provided at its four corners with vertical slots $p$, the upper and lower ends of which are inclined or offset in opposite directions in the manner represented in Figs. 19, 20, &c. The lower ends of these slots receive studs $r$, projecting from the sides of the stationary pins $n$, as shown in the various figures. When, therefore, the frame $o$ is moved vertically, the slots and pins cause it to be shifted forward and backward by the action of the pin within the inclined portions of the slots, and, owing to its connection with the pin-frame, it causes the latter to move forward and backward in like manner. The retracting-plate I is provided at its corners with ears having pins or studs $t$ to enter the upper portions of the slots $p$, as plainly shown, so that when the frame $o$ is depressed the upper ends of the slots will cause the retracting-plate to be moved backward away from the pin-frame to effect the retraction of the pins in the manner before explained.

The following are the actions of the parts in the sequence in which they occur. When the frame $o$ is fully elevated, the pin-frame stands in its forward position with the retracting-plate in contact therewith, as shown in Fig. 19, so that the pins may be adjusted through the action of the keys. As the frame $o$ descends, the pins $r$, acting in the lower ends of the slots, cause said frame $o$ and the pin-frame to be shifted bodily backward, so as to carry the ends of the adjusted pins which project beyond the others into position to effect the stoppage of the matrix-bars. The downward motion of the frame $o$ being continued, the upper ends of these slots are brought into play, and serve to force the retracting-plate away from the pin-frame, whereby all of the pins are moved forward in the pin-frame and restored to their normal positions, as represented in Fig. 21. The elevation of the frame $o$ first closes the retracting-plate against the pin-frame, as represented in Fig. 22, and finally moves the pin-frame and plate forward together to their original position, to be again adjusted by the keys without, however, interfering with the matrix-bars, which are in the meantime locked in position to permit the casting operation to be carried on.

*Adjusting-pin frame and connections.*—As before mentioned, the adjusting-pins J are mounted upon an upright supporting-frame, K, which is secured rigidly to and supported by a horizontal rack-bar, V, arranged to slide at its ends in bearings in the upright portion of the main frame, as shown in Figs. 3, 4, and 15, so that the frame K, with the adjusting-pins therein, may be moved from right to left and left to right to present the adjusting-pins to the stop-pins of the different matrix-bars, as before alluded to. This action is plainly represented in Figs. 2 and 3. The upper end of the pin-frame K is guided by a fixed grooved bar, $u$, as shown in Fig. 4. The cranked portions of the rock-shafts L are of such length as to permit the adjusting-pins J to travel freely thereon as the frame K moves to and fro. For the purpose of moving the pin-frame K to the right and left, as required, I combine therewith, as shown in Fig. 48, two alternately-acting weights, $v$ and $w$, made in the form of bars, and arranged to slide vertically in opposite sides of the main frame, the two bars being connected to cords $x$, passing over guide-pulleys $y$, and attached one to the pin-frame and the other to the rack-bar by which the pin-frame is carried. On top of the main frame there is pivoted at the middle a transverse lever, $z$, the opposite ends of which are arranged to engage beneath pins on the upper ends of the weights $v$ and $w$ alternately. The end of the lever adjacent to the weight $v$ is provided with a weight, by which it is held normally in a depressed position, while its opposite end is connected by a rod, $a'$, to a lever, $a^6$, and treadle, $a^7$. In the normal condition of the parts, the weighted lever $z$ stands in the position shown in Fig. 48, one end maintaining the weight $w$ in an elevated position, so that it has no effect on the frame K, while the weight $v$ is permitted to urge the frame toward the right. On depressing the treadle $a^7$, and thereby moving the lever $z$ to the position indicated by the dotted lines in Fig. 48, the effect will be to lift the weight $v$ out of action and release the weight $w$, so that it may descend and draw the pin-frame K to the left. This second or backward movement of the frame is principally for the purpose of correcting the spacing or effecting the justification of the lines, as hereinafter explained. At the commencement of operation the adjusting-pin frame K stands at the extreme left of the machine, with the adjusting-pins in position to act upon the stop-pins of the first matrix-bar, as before alluded to. This movement step by step toward the right is created by means of an escapement mechanism, W, (represented in Figs. 3, 12, 14, 15, and 16,) constructed as follows: The teeth on the upper edge of the rack-bar V engage a pinion, $b'$, fixed to a horizontal shaft, $c'$, having bearings in the main frame. At one end this shaft has fixed upon it an escapement-wheel, $d'$, which is engaged by a vertically-swinging detent, $e'$, the form of this wheel and detent being essentially the same as those described in my previous application hereinbefore named. The detent is urged upward by a spiral spring, $f'$, and stands normally in the position indicated in Figs. 12 and 14, its end abutting against one of the teeth of the escapement-wheel, and thus preventing the movement of the rack-bar and pin-frame to the right. From the detent $e'$ a link, $g'$, extends downward, and is connected by a rod to one of a pair of levers, $h'$, located in the bottom of the machine, and provided at its forward end with cross-bars $j'$, resting beneath the entire series of finger-keys in such manner that the depression of any finger-key, whether to designate a character or spacing-surface, will have the effect to depress the detent $e'$. The forward end of the detent has on its side two shoulders to engage the wheel. The lower shoulder stands slightly in advance of the other, and is separated therefrom by an intermediate opening sufficient for the passage of the teeth projecting from the side face of the wheel. The tooth of the wheel stands normally against the lower forward shoulder, as in Fig. 14. When the depression of the key occurs, the detent is depressed, so that the tooth of the wheel passes over the lower shoulder and encounters the upper shoulder, the wheel turning but slightly. When the key is released, the detent rises and disengages the tooth of the wheel, which then revolves until its next tooth in turn encounters the lower shoulder of the detent, the rack-bar and the pin-frame being thereby permitted to advance to the right a sufficient distance to carry the adjusting-pins from the stop-pins of one matrix-bar to those of the next.

The arrangement of parts to permit the advance of the pin-frame K during the rise of the finger-key, instead of during is depression, is of advantage in that it permits the lateral movement of the frame to occur at a time when the adjusting-pins are in their forward position, so that there is no danger of their engaging between or against the sides of the stop-pins during their lateral movement.

*Sustaining the inactive type-bars.*—In the present machine all the matrix-bars, when raised to the normal position, stand above the clamping mechanism hereinafter described, and in the action of the machine those bars, if any, which are not called into use at the moment, are permitted to remain in their elevated position, so that the clamps passing thereunder will act only upon those bars which have been designated for use. For the purpose of thus suspending the inactive bars, I provide a horizontally-sliding bar, R, mounted in the main frame in position to pass immediately beneath the heads D of all the bars in the manner plainly represented in Figs. 1, 4, and 25. This bar is urged forward in the proper direction to pass beneath the heads by means of a weighted cord passing over a guide-pulley, $a^5$, as shown in Fig. 25. It is moved in the opposite direction—that is to say, from under the heads—by means of an angular sliding arm, $b^5$, which is connected to the adjusting-pin frame K, so that the movement of the pin-frame to the right, in order to provide for the stoppage of the successive printing-bars, is accompanied by the withdrawal of the bar R, so that the designated bars may descend. When the movement of the pin-frame ceases, the bar R is permitted to remain beneath the heads of those type-bars which have not been called into action, so that they are maintained in their elevated position while the remaining bars descend. This maintenance of the inactive bars in the elevated position is of advantage, in that it permits the clamps to act on those bars only which are in use, so that the clamps may be employed in connection with the operative bars to determine the length of the mold in a manner hereinafter explained.

*Spacing and justifying mechanism.*—In practice it often happens that the designated characters and the minimum spaces first designated between the words are insufficient to fill out the line, while at the same time the remaining space will be insufficient to admit a word or a syllable. In order to fill out or justify the line under these circumstances, it is necessary to provide for the use of wider spaces. To this end I provide for the movement of the adjusting-pin frame step by step in a backward direction—that is, to the left—and its stoppage in front of those bars which have been designated for spacing, so that the proper spacing-keys may be actuated to project stop-pins representing spaces of such width as may be demanded. To secure this backward movement of the adjusting-pin frame and its stoppage in front of the spacing-bars only, I provide the devices represented in Figs. 12 to 14. The rack-bar V of the adjusting-pin frame is provided with a series of independent slides, $t'$, working through it from front to rear, their number and distance apart being the same as the matrix-bars. On the main frame there is pivoted an elbow-lever, $u'$, in such position that as the adjusting-pin frame advances to the right, the slides $t'$ are brought one after another opposite the upper end of the lever. This lever is connected, as in Fig. 12, to a pivoted arm carrying one end of the spacing-bar U, which latter is extended across the front of the entire keyboard and sustained at its opposite end by a second arm of like form, as represented in Figs. 1, 2, and 3. The arms which support the bar U rest upon one of the cross-bars, through which the escapement mechanism is operated, as before described. One of the arms which supports the bar U is also connected by a rod with one of the vertical cam-slides $a^2$, which serves through the intermediate parts, elsewhere described, to move the indicator a distance equal to the width of the minimum spacing-surface. As a result of the above actions, the depression of the spacing-bar U is followed, first, by the operation of the lever $u'$ and its movement of one of the slides $t'$ to the rear; second, by the advance of the counter or indicator to indicate the width of a minimum space; and, third, by the action of the escapement, so that on the release of the key the adjusting-pin frame will move to the right. On the main frame there is a fixed stop-arm, $w'$, against which the projected slides $t'$ engage, one after another, during the backward movement of the adjusting-pin frame—that is to say, its movement to the left—so as to arrest the adjusting-pins the second time opposite those matrix-bars which have been designated for spacing. The backward movement of the pin-frame is secured by depressing the treadle $a^7$, Figs. 1, 2, and 48, so as to bring the weight $w$ into play, as before explained. As the frame K moves backward, the stop-arm $w'$ first encounters that slide which was last projected, and thus stops the adjusting-pins opposite the matrix-bar last designated for spacing. After the proper key has been actuated to designate the space demanded on said matrix-bar, the slide which bears against the stop-arm $w'$ must be pushed forward out of engagement, so that the pin-frame may continue its backward movement until the next projecting slide encounters the arm and arrests the adjusting-pins opposite the next bar used for spacing. As the slides are thus returned one after another to their normal positions, the adjusting-pin frame will be carried step by step to the left until the adjusting-pins have been presented opposite all the bars designated for spacing.

For the purpose of restoring and disengaging the slides $t'$, as above, I make use of the elbow-lever $l'$, pivoted to the frame and connected, by the rod $n'$, with a cross-bar, $o'$, sustained in a pivoted arm and arranged to be depressed by projections on the under side of all the spacing-keys. The upper end of the lever $l'$ is projected laterally, as in Fig. 14, in order to engage the teeth of a second escapement-wheel, $r'$, secured firmly on the shaft which carries the main escapement-wheel, $k'$, before described. There is a separate spacing-key to represent each spacing-surface on the matrix-bar. These keys are connected with crank-shafts, adjusting-pin, and stop-pins in precisely the same manner as the keys which designate characters, the action of a spacing-key being in all respects the same as that of a printing-key, except that it causes the bar to be arrested with a spacing-surface at the aligning-point in place of a character. The backward movement of the pin-frame and rack-bar turns the escapement-wheel in the opposite direction from that in which it first turned. In operating the machine the spacing-bar U is operated whenever a point is reached in which a blank or space is to appear in the line. It will be remembered that the operation of this bar advances the indicator and the escapement, and projects a slide, $t'$, but does not affect the stop-pins. When, therefore, all the characters for a line have been designated, stop-pins will have been projected to arrest all those bars which are to present characters, but not the bars intended for spacing. At this stage the operator, referring to the indicator, will perceive the amount of space remaining to be filled at the end of a line, and knowing approximately or precisely the number of spaces occurring in the line is enabled to decide the width of the spaces to be introduced in order to fill the line. When the proper spacing-key is depressed to project the appropriate stop-pin, the lever $l'$ swings forward, and at the same time that it restores and disengages the slide to allow the further retreat of the pin-frame, its upper end passes beneath one of the teeth of the secondary escapement-wheel $r'$, so as to prevent the wheel from turning any considerable distance and the pin-frame from moving while the finger-key is down. When the key is released, the lever $l'$ is drawn back from the wheel $r'$, and the pin-frame is moved to the left until the next projecting slide encounters the stop-arm, so as to bring the adjusting-pin opposite another spacing-bar. By the recurrence of the above actions, produced by repeated depressions of the key representing the spaces of proper width, be it greater or less, the stop-pins are so adjusted that the matrix-bars previously designated for spacing are stopped with spaces of the required width between the aligned characters.

*Indicating mechanism.*—In order that the operator may know at all times the space remaining to be filled in a line, so that he may decide when to cease the designation of characters and commence the justification, I provide an indicating mechanism which shows the aggregate width of the characters and spaces designated. This indicating mechanism is connected with and actuated by the rods O, which lead from the finger-keys to the pin mechanism, as fully represented in Figs. 1, 2, 3, 4, 15, 29, and 30. Each of the rods, it will be remembered, actuates an adjusting-pin, which represents a given character or space on all the matrix-bars. Corresponding characters and spaces have precisely the same width on all the bars. Each rod is divided transversely, as in Figs. 2 and 7, to permit the introduction of a vertical slide, $a^2$, which forms in effect a part of the rod, and which works vertically through openings in fixed guide-plates $b^2$, extending across the front of the machine above the key-board. Each of the slides $a^2$ is provided on one side with an incline or cam-surface, $c^2$, the lift or departure of which from the vertical is equal to the width of the particular character or space brought into action by the rod and key connecting with said slide. In other words, each key is connected with a cam-slide having a lift which corresponds precisely with the width of the character or space designated by the key. The slides pass also through a horizontally-reciprocating bar, $d^2$, which bears against the inclined edge of all the cam-slides when they are in their normal elevated positions, as shown in Fig. 30, so that the depression of either key and slide is followed by the movement of the bar $d^2$ to the right a greater or less distance. When the key and slide rise, the bar is returned to the left by a spring, $e^2$. At one end the reciprocating bar carries a pivoted arm or dog, $f^2$, which encircles and engages frictionally with a horizontal indicator-rod, $g^2$, sliding horizontally in guides and carrying at one end a finger or pointer, $h^2$, which traverses a fixed graduated plate or scale, $i^2$. A second dog, $j^2$, pivoted to the main frame also encircles the indicator-rod to prevent its retrograde motion. As the successive keys are actuated, their cam-slides cause the bar $d^2$ to reciprocate different distances, and the dog $f^2$ to repeatedly engage the indicator-rod and move it to the right step by step, so that the pointer will at all times indicate on the scale the aggregate width of the characters and spaces designated for use as well as the space remaining to be filled. Knowing the last-mentioned space and the number of bars designated for spacing purposes, the operator has only to depress the treadle and depress repeatedly that spacing-key representing the space which, multiplied into the number of spacing-bars, will give the space to fill the line. This operation is exceedingly simple, and may with slight practice be rapidly performed. After the completion of the line, the indicator is automatically unlocked and is returned to the left by a spiral spring, $k^5$, inclosed in a tube, into which one end of the rod slides. The unlocking of the indicator is accomplished by devices connecting with the alarm mechanism, now to be described.

*Alarm mechanism.*—A bell, $l^2$, and a pivoted elastic striker, $m^2$, are mounted on the main frame. The striker is actuated by a spring, $n^2$, and is provided at the rear end with two arms, $o^2$ and $p^2$, having studs which act on the feeding and locking dogs $f^2$ and $j^2$ of the indicator, to release them and permit the return of the indicator at the instant that the bell is sounded a second time to show the completion of the line. The striker is lifted away from the bell and set for action by a vertical slide, $q^2$, having on its edge, as in Figs. 29 and 31, an inclined surface to act against a rigid arm on the striker. As the striker is lifted, its arm is engaged and held by a pivoted spring-actuated elbow-lever, $r^2$, having a shoulder, $s^2$, on its side. The indicator-rod $g^2$ has at one end two projections, $t^2$ and $u^2$, of different lengths. When the line is at a certain distance from completion, the stud $t^2$ encounters the detent-lever $r^2$, and disengages its end from the striker, which falls until it encounters the shoulder $s^2$, when it springs or yields sufficiently to strike the bell, but immediately rises out of contact therewith. As the line reaches completion, the stud $u^2$ operates the detent-lever and disengages the shoulder $s^2$, whereupon the striker is permitted to fall against the bell and sound the same a second time, this action being accompanied by the release of the indicator-dogs and the return of the indicator, as already explained. The vertical slide $q^2$, before referred to as the means of setting the striker, has at its extreme upper end an incline, $v^2$, on its side, so that when fully depressed this incline will trip the detent $r^2$ and cause the striker to fall in order that the indicator may be returned to the starting-point. This is for the purpose of enabling the operator in the event of an error to restore all the parts to their initial positions, that the line may be commenced anew. The slide $q^2$ is sustained normally in its elevated position, as shown in Fig. 15, by an arm, $w^2$, on a rock-shaft, $x^2$, in bearings in the main frame. This shaft, which extends in a fore and aft direction, also carries an arm, $y^2$, which acts against the rack-bar V to return the adjusting-pin frame K to the starting-point at the left. The shaft $x^2$ is further provided with an arm, $z^2$, united by a swivel-joint to an arm, $a^3$, on a transverse rock-shaft, $b^3$, to which the reversing-lever M is also attached, as in Figs. 1, 3, 16, and 17, 18. In consequence of this connection and the other connections already described, the lever M is caused to serve the several purposes of moving the stop-pin frame and retracting plate, of restoring the indicator, and of restoring the adjusting-pin frame. In short, it restores all the parts in an instant to the condition for the commencement of a new line. The lever is maintained in its elevated position by means of a weight applied to its rear end, as shown in Figs. 16 and 17. This weight also overbalances the weight of the frame $o$, which shifts the adjusting-frame, so that it is sustained in its elevated position.

*Casting mechanism.*—The casting mechanism embraces as the leading features, first, devices to align and clamp the matrix-bars; second, a sectional mold which is closed in an operative position in front and against the matrix-bars to present the molten metal to the line of selected characters to give form to the resulting bar or cast; and, third, appliances for melting the type-metal and delivering the same forcibly into the mold and against the matrix-bar.

Referring first to the mechanism for aligning and clamping the matrix-bars, attention is directed particularly to Figs. 1, 11, 32, 33, 34, 45, and 49. A horizontal clamping-bar, A', extends, as shown in Figs. 11 and 45, transversely of the machine in position to extend across and against the rear edges of the entire series of matrix-bars when they are located in an operative position. This clamping-bar has suitably-formed arms which are connected to the main frame by means of dovetailed guides, as represented at $d^3$, Figs. 1 and 45, whereby the bar is permitted to move forward and backward to and from the matrix-bars. At the opposite side of the position occupied by the matrix-bars I arrange the horizontal sectional mold X X', consisting of two horizontal bars, one overlying the other, at a distance therefrom equal to the thickness of the required printing-bar. Each of these mold-sections may be worked from the solid in a single piece, or, for convenience of construction, composed, as shown, of parts or pieces inseparably united by rivets, screws, or other fastenings. Each of the mold sections or slides is formed, as shown in Fig. 35, with a shoulder, $f^3$, which serves as the ends of the mold.

Referring to Fig. 35, it will be seen that when brought into the relation shown, the two parts of the mold inclose a flat rectangular space, which is of a size and form corresponding with that of the printing-bars to be produced. By moving the mold-sections endwise with respect to each other the length of the mold proper may be increased or diminished, and thus the machine adapted to produce printing-bars of different lengths. By separating the mold-sections in an endwise direction, as represented in Fig. 34, the mold is opened in order to release and permit the removal of the casting formed therein.

As shown in Figs. 34 to 38, and also in Fig. 45, the upper mold-section is dovetailed to and arranged to slide on the under side of a guide-bar, $h^3$, bolted rigidly to the main frame, while the lower mold-section, X', is arranged to slide in like manner on a guide, $i^3$, also bolted to the main frame.

The location of the two guides is such that when the mold is closed to an operative position, it will stand directly across the front or operative edges of the series of matrix-bars, presenting its open side in front of the line of selected characters. The opposite or rear side of the mold is closed by the flat mouth or face of a melting-pot, Y, which has a narrow slit or opening, $j^3$, for the delivery of the molten metal into the mold directly toward the matrix-bars at the opposite side thereof.

The melting-pot is fixed in the top of a box or chamber, C', which also contains a burner, D', by means of which the pot is heated and the metal maintained constantly in a molten condition. The box C' is connected by horizontal pivots $k^3$ at its lower side to the main frame, so that it may tip forward and backward to and from the mold. At its upper side the box C' is connected by links $l^3$ to the upper ends of levers $m^3$ on a transverse rock-shaft, $n^3$, mounted in the arms of the sliding clamping-bar A', before referred to. It follows as a result of this arrangement that when the levers $m^3$ are moved in the direction indicated by the arrow in Fig. 45, the clamping-bar A' will be moved forward, so as to force the matrix-bars tightly against one side of the mold, after which the mouth of the melting-pot will be drawn firmly against the mold on the opposite side. The manner of operating the levers $m^3$ will be hereinafter described. Their reverse motion will have the effect of permitting the melting-pot and matrix-bars to separate from the mold in order that the latter may be opened and the matrix bars readjusted.

In order to prevent the entrance of the molten metal between the adjacent faces of the matrix-bars, it is necessary that they shall be clamped firmly together previous to the casting operation. For this purpose I employ laterally-acting clamps $o^3$ and $p^3$, which slide on horizontal guides located at opposite sides of the machine on the face of the clamping-bar A', as plainly represented in Figs. 11, 32, 33, and 34. These clamps are connected by horizontal pins $q^3$ to the respective mold-sections, so that when moved inward to act against the sides of the bars they have the effect of carrying the mold-sections to an operative position. The inner ends or faces of the clamps stand in line with the shoulders forming the inner ends of the mold, as indicated by the dotted lines in Fig. 50, so that when the inward movement of the clamps is arrested by their contact with the matrix-bars the ends of the mold are also brought accurately in line with the faces of the outer matrix-bars, so that the length of the mold must coincide precisely with the length of the line of selected or assembled characters. The employment of the matrix-bars which are in use as a means of determining the length of the extensible mold is an important feature of the invention. The clamps $o^3$ and $p^3$ are operated, as shown in Figs. 11, 32, and 34, by links connecting them with the upper ends of levers $r^3$ and $s^3$, pivoted to the main frame and actuated by cam-wheels $t^3$, the wheels being grooved to engage studs or rollers at the extremities of crank-shafts $u^3$, secured on the shafts $v^3$, which carry the levers last mentioned. The clamp $p^3$ is moved positively in both directions, and under any given adjustment advances always to the same position. The clamp $o^3$, at the opposite side of the machine, is actuated with a yielding pressure in order that it may accommodate itself to the varying width of the series of bars which may be brought into action between the two clamps. This yielding action of the clamp is secured by mounting its operating-arm $u^3$ loosely on its shaft $v^3$, and connecting the two by means of a spiral spring, as shown in Fig. 49, or by any equivalent yielding connection.

Previous to the clamping of the matrix-bars it is necessary that they shall be aligned with great accuracy.

For the purpose of effecting a preliminary alignment, I provide the lateral clamp $o^3$ with a horizontal pin, $x^3$, projecting inward in advance thereof, so that as the clamp advances toward the bars the pin will first be thrust through the holes in the entire series of bars and until it enters a hole in the clamp at the opposite side of the machine. This aligning-pin is ordinarily pointed at the ends and made of such size as to fit loosely within the perforations of the bars. If demanded, however, it may fit closely within the bars and thus serve as the sole means of alignment. As the clamp recedes to release the bars, the aligning-pin is withdrawn from the bars.

In order to avoid the danger of the bars swinging or moving laterally in such manner as to bind upon or engage with the pin, I make the face $y^3$ of the clamp $o^3$ separate from the remaining portion, so that it may slide independently thereon, as represented in Figs. 32, 34, and 50. This independent section, commonly designated the "stripper-plate," is provided with a friction-spring, $a^8$, bearing against the guide, as represented in Figs. 33 and 34, or is combined with other suitable friction devices, which will render it necessary to apply a considerable force in order to effect its movement. As a result of this construction, the stripper-plate will remain in position and prevent lateral movement of the matrix-bars during the backward movement of the clamp and aligning-pin in the manner represented in Fig. 33, thus insuring the retraction of the pin without difficulty. The backward movement of the stripper-plate a sufficient distance to permit the descent of all the matrix-bars in advance thereof is secured by means of a spindle, $z^3$, extending therefrom loosely through the clamp $o^3$, with a head at the outer end, as shown in Fig. 32. This spindle permits the necessary independent or lost motion between the clamp and stripper-plate, but causes the former to retract the latter at the completion of its movement.

As a means of perfecting the alignment of the bars vertically, previous to the closing of the clamping devices thereon, I mount in the clamping-bar A' a horizontal plate, $a^4$, arranged to slide forward and backward therein, having one edge adapted to enter the notches or indentations in the rear edges of the matrix-bars. When forced forward into these notches, the aligning-plate $a^4$ insures the accurate adjustment of the designated characters, so that in the resulting cast they will form a straight line. The plate $a^4$ is advanced for action by a cam, $b^4$, applied to the shaft of the clamp-operating levers $m^3$, the cam being so adjusted as to advance the aligning plate before the clamping-bar is closed tightly against the matrix-bar.

Mention was previously made of the fact that the mold opens horizontally to permit the delivery of the completed bar. The upper section, X, of the mold is provided on its under face, as shown in Figs. 36, 37, 38, and 44, with a longitudinal rib, $c^4$, which enters the top of the casting to retain the same against lateral displacement. This portion of the mold is further provided, as shown in the same figures, with a depending stud, $d^4$, which enters the upper side of the casting to insure its passage endwise with the upper portion of the mold as the latter is opened. When, therefore, the mold is opened, the casting is carried to the right, adhering beneath the upper part of the mold. When the casting has been carried entirely clear of the lower part of the mold, its delivery is effected by means of a plate, $e^4$, pivoted, as shown in Figs. 1 and 11, to swing in a vertical direction, its position being such that as it descends its edge will engage the rear edge of the bar and drive the same downward away from the top of the mold. Each casting thus delivered falls upon a shelf or support, $f^4$, as shown in Fig. 34, in advance of a pin, $g^4$, extending to the lower part of the mold at the opposite side of the machine. As the mold recloses, the pin $g^4$ will push the casting formed at the previous operation endwise from the shelf $f^4$, each casting being delivered in rear of the one previously formed, so that they push one another from the machine. The delivery-plate $e^4$ is connected in rear of its pivot to a rod, $i^4$, which serves as a weight to maintain the forward edge of the plate normally in an elevated position, and which has its upper end provided with a head and extended through an arm or guide on the lifting-head, $p$, by which the matrix-bars are lifted. As this head completes its upward movement, so that the matrix-bars assume their normal positions, it lifts the rod $i^4$ and causes the same to operate the plate $e^4$.

In order that the printing-bars may have flat faces and a uniform height, it is deemed advisable, although not absolutely necessary, to plane or dress their lower edges or bases. For this purpose I mount on the main frame a depending knife or cutter, $j^4$, as shown in Figs. 2, 11, and 34, in such position that the base of the casting will be carried past its edge in the act of delivery. In this connection the rib $c^4$ on the upper part of the mold is an important feature, in that it retains the casting securely and causes it to be carried in a right line past the cutter.

For the purpose of preventing the accumulation of metal at the delivery mouth or outlet of the melting-pot, I provide the lower portion of the mold with an upright blade or wiper, $k^4$, as shown in Figs. 34, 39, 40, and 41, usually a thin plate of spring-steel, which is carried over the mouth of the pot as the mold is opened and closed.

In order to insure the speedy action of the apparatus and the formation of a perfect cast, I propose to employ, in connection with the melting-pot, a pump or forcing apparatus of any suitable character to deliver the metal therefrom into the mold. I recommend for this purpose, as the most simple and reliable known to me at the present time, a pump of the character represented in Fig. 45. The delivery duct or channel $j^3$ of the melting-pot, having at its mouth a long exceedingly narrow slit or opening, is extended downward to the bottom of the pot and terminates in an upright cylindrical chamber provided near the top with an inlet-opening, $m^4$, through which the metal enters the same. In the top of this chamber there is mounted a vertically-reciprocating piston, $n^4$. When this piston is raised above the opening $m^4$, the metal passes thereunder. When the piston is depressed, it passes and closes the inlet-opening and delivers the metal through the opening $j^3$ to the mold. The depression of the piston is effected by means of a spiral spring, $o^4$, applied to its upper end, as shown in Figs. 1 and 34, this use of this spring being advantageous in that it insures the application of a constant pressure, and also in that it avoids the danger of breakage which would otherwise arise in the event of the metal being solidified beneath the piston, as at the commencement of operations. The elevation of the piston is effected by means of an arm, $p^4$, mounted on a rock-shaft having a depending arm, $q^4$, the lower end of which is acted upon by a lifting-cam, $r^4$, as plainly shown in Fig. 45.

For the purpose of increasing the capacity of the machine I propose to provide the frame adjacent to the molds with passages $s^4$, through which water or other cooling mediums may be passed to reduce the temperature of the parts.

*Details of drawing-gear.*—The machine receives motion, primarily, through a band-pulley, $c^5$, which revolves loosely on a tubular shaft, $d^5$, carrying a fixed crank-arm, $e^5$. The inner face of the pulley carries a stud or projection, $f^5$, while the crank carries an axially-sliding pin, $g^5$, designed to engage the stud for the purpose of imparting motion from the pulley through the crank to the tubular shaft. The pin $g^5$ is notched transversely, so that when it stands in the position shown it will permit the stud to pass and the pulley to revolve without driving the shaft. The clutch-pin $g^5$ is attached to an arm, which is in turn connected to a rod or spindle, $h^5$, sliding longitudinally within the tubular driving-shaft. The inner end of the spindle is connected by a pin passing through the slits in the shaft to an external collar, $j^5$, which is grooved circumferentially and connected by a pin or its equivalent to a controlling or shipping lever, $k^5$, the motion of this lever in one direction serving to engage the clutch-pin and set the shaft in motion, while its movement in the opposite direction effects the disengagement. The shipping-lever is operated in the first instance to engage the clutch by means of a hand-lever, Z, which extends to the front of the machine in position to be operated by the attendant. The parts are held in connection for the proper length of time by means of a wheel, $l^5$, acting against a roller at the lower end of the shipping-lever $k^5$, this wheel being provided in one side with a notch into which the roller may fall, as shown in Fig. 46, to permit the disconnection of the clutch. A worm-wheel, $m^5$, applied to the shaft of the wheel $l^5$, is turned by a worm on the end of the driving-shaft. When the hand-lever Z is operated to engage the clutch, motion is communicated from the shaft to the wheel $l^5$, which is at once turned so as to carry its notch away from the roller of the shipping-lever, the effect of which is to retain the clutch in engagement until the wheel $l^5$ has made a complete revolution and again brought the notch beneath the roller, whereupon the parts automatically disengage. The other parts of the machine are so timed that this single rotation completes the production of a printing-bar. The shaft $A^3$, which carries the wheel $l^5$, also carries a cam, $r^4$, before alluded to, for operating the pump.

To effect the tilting of the melting-pot, as before described, the wheel $l^5$ is provided in one side, as in Fig. 45, with a cam-groove, $n^5$, which engages a roller on a lever, $o^5$, the lower end of which is connected by a rod, $p^5$, to the lever $m^3$, which actuates the main clamping-bar, the tilting-pot, and the rear aligning-bar.

To effect the automatic adjustment of the stop-pin frame and retracting-plate, which, it will be remembered, are operated from the lever M, as shown in Figs. 1 and 16, I connect the said lever $q^5$, which extends downward to one end of a lever, $r^5$, which is in turn pivoted to the main frame and raised and lowered at suitable intervals by means of a cam, $s^5$, which is also mounted on the shaft carrying the cams before alluded to. The lifting-head P is carried, as shown in Fig. 3, by an arm, $t^5$, sliding in a dovetailed groove in the upright portion of the main frame. It is sustained and elevated to lift the bars by means of a chain, $u^5$, attached to and arranged to wind upon a pulley, $v^5$, mounted on a horizontal shaft in the top of the main frame. This shaft is provided, as shown in Fig. 1, with a pinion, $w^5$, operated by a vertical rack-bar, $x^5$, the lower end of which is attached to an operating-lever, $y^5$, lifted at proper intervals by a cam, $z^5$, mounted on the shaft $A^3$.

It will be observed that all of the driving cams and wheels are mounted upon the single transverse shaft.

*Operation.*—The operation of the machine as a whole is as follows: The parts stand normally in the position represented in Fig. 1, the head $p$ being in its elevated position, and the entire series of matrix-bars suspended thereby at their highest elevation. At this time the weight $v$ acts to urge the adjusting-pin frame toward the right, the indicator mechanism stands at zero, the alarm mechanism is set for action, and the stop-pins stand in their normal positions—that is to say, in line with each other—as represented in Figs. 22 and 24. The operator now depresses in succession the various keys representing the characters to be employed in the order in which the characters are to appear. At the termination of each word, or at other suitable points, he depresses the spacing-bar. At the depression of the first key the corresponding adjusting-pin forces backward the appropriate stop-pin to arrest the motion of the first bar. When the key is released, the adjusting-pin frame moves toward the right, thus bringing the adjusting-pins opposite the second matrix-bar, so that at the operation of the second key the stop-pin to arrest the second matrix-bar is in turn projected to the rear. This operation is repeated until a suitable number of spaces and characters has been designated. The aggregate value in width of the characters and spaces thus designated will appear on the indicating mechanism at the front. At a suitable time, near the completion of the line, the alarm mechanism will give notice that the line is nearly completed, and the operator inspecting the indicator will determine whether or not there is sufficient room remaining to be filled by additional letters or characters. If not, he observes on the scale the width of the space to be filled, and knowing the number of bars which have been indicated for spacing purposes he presses the foot-lever $a^7$, in order to permit the movement of the adjusting-pin frame to the left, and repeatedly depresses the particular spacing-key representing a spacing-surface of suitable width. The result of this action is to cause the projection of the stop-pins representing spaces on the bars which have already been designated for spacing. At the completion of this operation there will be a sufficient number of stop-pins projected to arrest all of the bars which are to be called into use, but as yet the pins do not project sufficiently to the rear to effect the stoppage of the bars. The operator now depresses the lever Z, the effect of which is to set in action the automatic mechanism. The first effect of this action is to cause the stop-pin frame to be moved rearward in order to bring the rear ends of the stop-pins to arrest the matrix-bars, as indicated in Fig. 20. The lifting-head $p$ now commences its descent, lowering the entire series of matrix-bars, which are individually arrested by their respective stop-pins in such position as to bring the selected characters in the common line opposite the mold. As the movement of each bar is arrested, the lifting-head descending therefrom permits the dog Q of said bar to engage the rear guide-plate, $i'$, and sustain the bar after the disengagement of the stop-pin. After the matrix-bars have been adjusted, the clamps $p^3$ and $o^3$ advance from opposite sides to clamp the bars between them. The clamp $p^3$ reaches its limit of movement in advance of the other, so that on one side the series of bars stand always at the same point. The clamp $o^3$, continuing its movement, applies a yielding pressure to the series of bars, which are thus confined snugly together irrespective of their number or width. As the clamp $o^3$ advances, the aligning-pin thereon is advanced through the bars, whereby they are brought to substantially the required adjustment previous to the action of the clamps thereon. At or about the time that the lateral clamps act on the bars the aligning bar or blade $a^4$ enters the grooves in their rear edges, thus perfecting the alignment. This action is immediately followed by the advance of the clamping-bar A' from one direction and of the melting-pot from the opposite direction. At this time it will be perceived the matrix-bars are locked firmly in position on all sides, with the mouth or delivery-port of the melting-pot in intimate contact with the mold. Immediately after the foregoing operation the piston $n^4$ descends, delivering the molten metal forcibly into the mold, where it immediately assumes the form of a printing-bar, the edge of which bears in relief the letters or characters in the sequence and arrangement in which they are to be printed. The melting-pot and clamping-bar A' and the aligning-bar $a^4$ now retreat, and at or about the same time the lateral clamps are moved apart, withdrawing the aligning rod or pin from the bars. The retraction of the lateral clamps is accompanied by the opening of the mold, the upper portion of which carries the newly-formed bar to one side of the machine, where it is detached from the mold by the plate $e^4$, as before explained.

During the performance of the casting operations above described the retracting-plate K was moved in such manner as to draw all the stop-pins backward within their supporting-frame, so that they no longer engaged the heads and slides of the matrix-bars, which latter were thereafter sustained wholly by the dogs Q. After the retraction of the pins, as above stated, the pin-frame was moved bodily forward, carrying the entire series of stop-pins to their normal position, so that the operation of the finger-keys to designate the characters for the second line could be carried on without interfering with the casting of the first line.

*Modifications.*—While I prefer to employ continuous or rigid matrix-bars, as hereinbefore described, it is to be distinctly understood that I may substitute therefor bars composed of short sections jointed together after the manner of a chain, these jointed bars being adapted for operation in connection with the other parts of the machine in substantially the same manner as the rigid bars hereinbefore described. It is also to be understood that in place of the matrix-bars I may substitute in connection with the casting mechanism matrix-wheels arranged to operate in essentially the same manner as the wheels described in Fig. 40 of my application for Letters Patent filed on the 10th day of July, 1884, No. 137,225.

While practical experience has shown that molten type-metal is the best material known in the art at the present day for the formation of the matrix-bars, it is to be understood that I may substitute therefor any plastic material adapted to be forced into the mold for the formation of printing-bars, and this whether the material hardens or solidifies within the mold or whether it requires additional treatment, such as baking, after delivery therefrom.

The matrix-bars herein described constitute an important feature of my invention. While it is preferred to use them in connection with mechanism such as herein described for adjusting and clamping them, and for taking an impression from the aligned characters, it should be understood that they are adapted for use in machines other than the one shown, and indeed that for special purposes they can be adjusted and operated by hand, the advantages arising from the tapering form, the presence of the spacing-surfaces between the characters, and from the other features of novelty, being in no wise dependent on the other parts with which the bars may be used. For these reasons, and because the invention in this regard resides in the individual bar rather than in the duplication of the first bar, I make claim herein to the form of the individual bar.

I am aware that an attempt has been made to connect separate dies or matrices, each representing a single character, by means of thin flexible bands or cords to which they were attached.

It is to be noted that my bar is continuous; that it possesses a considerable stiffness or rigidity, so that it may be pushed or pulled endwise without difficulty; that the characters are formed directly in the bar and in close proximity to each other, instead of being widely separated, as was necessary with dies united by flexible connections.

I believe myself to be the first to produce a solid or continuous matrix-bar having the characters impressed or indented directly therein, and the first to produce a matrix-bar presenting continuous or practically continuous side faces, so that when arranged side by side the bars may be moved past each other without collision and without the necessity of intermediate guides. I also believe myself to be the first to provide a matrix-bar with spacing-surfaces elevated above the level of the characters therein, and the first to locate spacing-surfaces at suitable points between the characters, so that a bar may be stopped at different points in the course of its descent to present a blank surface at the aligning-point.

I also believe myself to be the first to combine with a changeable or convertible matrix—that is to say, a matrix composed of a series of dies or individual matrices adapted for transposition or rearrangement—a mold and a casting mechanism, and it will be manifest to the skilled mechanic that the construction of the mold and of the mechanism for delivering the metal therein may be modified without changing substantially the mode of connection or departing from the limits of my invention.

Having thus described my invention, what I claim is—

1. A continuous matrix-bar having a series of intaglio characters formed in its edge to be read transversely thereof, as contradistinguished from a series of matrices united by a flexible band or cord.

2. The improved matrix-bar for use in a stereotyping-machine, consisting of a continuous bar having in its edge a series of transverse grooves or notches each with an intaglio character therein, substantially as described and shown.

3. An improved matrix-bar for use in a stereotyping-machine, consisting of a continuous bar tapered on its side faces, and provided in its edge with intaglio characters arranged in the order of their width, and with intervening surfaces raised above the characters.

4. The improved matrix-bar for use in stereotyping consisting of a tapered bar having at its edge intaglio characters arranged in the order of their width, and blank spacing-surfaces of different widths also arranged in the order of their width at suitable points between the characters.

5. A matrix bar or strip provided at its edge with a line or series of intaglio characters, and with a series of spacing-surfaces of different widths distributed between the characters, substantially as described and shown, whereby all the bars may be moved in the same direction and each bar caused to present a character or a space at the aligning-point, as demanded.

6. The matrix-bar containing the intaglio characters, and the notches to receive an aligning device.

7. The matrix-bar containing the intaglio characters and the transverse perforations, substantially as shown.

8. The combination, substantially as described and shown, of a series of bars each tapered endwise and in the opposite direction from the bar or bars next adjacent thereto, and each provided at the edge with a series of characters whereby single characters on the several bars may be brought to a common line without being thrown from a vertical position.

9. In a machine for producing type-bars and the like, the series of parallel bars or carriers, each provided with a line of intaglio characters, and intervening spacing-surfaces arranged in the order of their width, said bars being combined and adapted for independent motion in a longitudinal direction, substantially as described.

10. In a machine for producing printing-bars, the combination of a plurality of independently-movable bars, arranged side by side, tapered alternately in opposite directions, and provided at one edge with intaglio characters and spacing-surfaces, substantially as described.

11. The series of longitudinally-moving bars tapered alternately upward and downward, and provided with intaglio characters and spacing-surfaces, in combination with a series of finger-keys to designate the characters, devices, substantially as described, for arresting the individual bars at different points, and the connecting mechanism, substantially as described, between the keys and stop devices, whereby the designated characters and spaces may be assembled in a common line to form a matrix.

12. A temporary or convertible matrix for type bars or lines, consisting of a series of parallel independently-movable bars provided at their edges with intaglio characters and intervening blank surfaces rising above the characters.

13. The matrix-bars B, tapered in one direction and connected to heads D, and the intermediate matrix-bars tapered in the reverse direction and connected with slides E by intermediate devices, substantially as described, causing them to move in the opposite direction from said slides, in combination with stop-pins engaging, respectively, the heads of bars B and the slides of bars B'.

14. In combination with the series of matrix-bars alternately tapered upward and downward, and each having characters arranged therein in the order of their width, the heads attached to all the bars, the reversely-moving slides connected to the alternate bars, the stop-pins arranged in rows extending at right angles to the length of the bars, and the laterally-movable frame provided with adjusting-pins each arranged to act upon the corresponding stop-pins of all the bars.

15. The combination, substantially as described, of the sliding heads D, having the tapered matrix-bars attached, the grooved guide-plates for said heads, the slides F, the cords or chains E, passing over pulleys from slides F to the alternate matrix-bars, and the two series of stop-pins extending rearward different distances to engage the heads and slides, respectively, as shown.

16. In combination with the matrix-bars and stop-pins, the adjusting-pins slotted at one end, and the crank-shafts extended through said slots, as shown.

17. The vertically-grooved guide-plates i i, the latter provided with shoulders or notches, in combination with the sliding heads D, having the matrix-bars attached, the dogs Q, pivoted to said heads and provided with the two shoulders at the lower end, the springs to actuate said dogs, the lifting-head P, and the stop-pins.

18. In combination with the stop-pins G G', their sustaining-frame H, the retracting-plate I, the supporting-studs $n$, on which said frame and plate move forward and backward, and the vertically-movable frame $o$, seated in grooves in the frame H, and provided with the sinuous slots connected with the retracting-plate and the studs $n$, as described and shown, whereby the longitudinal motion of the frame $o$ is caused to effect the joint and independent motion of the pin-frame and retracting-plate, and thereby the various adjustments of the stop-pins.

19. In combination with the gravitating matrix-bars and their sustaining-heads, the transverse sustaining-bar, the stop-pins, the laterally-movable frame K, the adjusting-pins therein, and the connection, substantially as described, between said frame and the bar, whereby support is afforded for those bars not called into action.

20. The combination, substantially as described and shown, of the matrix-bars, finger-keys to designate the characters, the intermediate stop mechanism, substantially as described, whereby the keys are enabled to arrest the advance of the respective bars, and the bar or support to prevent the advance of those bars which are not called into action.

21. The series of matrix-bars, combined, substantially as described and shown, with the finger-keys, the laterally-movable frame provided with adjusting-pins, the stop-pins, the lifting-head P, the dogs Q, and the sliding bar, whereby designated characters of the respective bars may be brought to a common line and those bars not called into use retained in their normal position.

22. The tapered independently-movable matrix-bars, each provided with intaglio characters and two or more spacing-surfaces differing in width, in combination with finger-keys designating the respective characters and spaces, and intermediate stop devices, substantially as described and shown, acting directly to arrest the respective bars with their predetermined characters and spaces in a common line.

23. The adjusting-pins, slotted as shown, in combination with the crank-shafts passing through the slots, the springs applied to rock said shafts, the finger-keys, and the rods extending from the keys to the shafts, whereby the springs are caused to retract the adjusting-pins and lift the keys.

24. The matrix-bars, the finger-keys to designate the characters, mechanism, substantially as described, to arrest the advance of the individual bars, the rods O, to actuate said mechanism, the cam-slides $a^2$, attached to said rods, and the indicating mechanism, substantially as described, connected to and operated by said slides, whereby the aggregate width of the designated characters is automatically shown.

25. In combination with the slides $a^2$ and $d^2$, the dogs $j^2$ and $f^2$, the indicator-rod and its returning-spring, provided with the projection $u^2$, the detent $r^2$, and the spring-actuated arm, whereby the indicator is automatically operated and restored to the starting-point.

26. The alarm-bell and its spring-actuated striker having the arms to release the dogs, in combination with the slide $d^2$, dogs $f^2$ and $j^2$, indicator-rod $g^2$, with the stud $u^2$, and detent $r^2$, whereby the alarm is operated to indicate the completion of the line, and the indicator automatically restored to the starting-point.

27. The bell and its spring-actuated striker bearing two trip-arms, in combination with the indicator-rod bearing studs $u^2$ $t^2$, its restoring-spring, the detent $r^2$, bearing the shoulder $s^2$, the dogs $f^2 j^2$, plate $d^2$, and slides $a^2$, connected to the respective finger-keys.

28. In combination with the bell and spring-actuated striker, the detent having both the extremity and the shoulder to engage the striker, and the indicator-rod provided with the two studs $t^2$ and $u^2$, whereby the alarm is caused to sound twice, as and for the purpose described.

29. In combination with the stop-pins arranged in horizontal rows, as described and shown, the laterally-movable frame K, having adjusting-pins J mounted therein, the two weights tending to move the frame K in opposite directions, and mechanism, substantially as described, for throwing said weights into action alternately at will, whereby the series of adjusting-pins may be carried backward past the successive stop-pins to effect the justification or correction of the spacing.

30. The independent tapered matrix-bars, each provided with a plurality of spacing-surfaces, the row of stop-pins for each bar, the series of adjusting-pins mounted in the laterally-movable frame, the finger-keys and connections whereby they are enabled to project the adjusting-pins, the bar V, provided with the slides to arrest the backward movement of the adjusting-pin frame, the space indicating bar and its connections to project the slides, and the device, substantially as described, to restore said slides connected with all the spacing-keys, whereby the operator is enabled to first adjust the stop-pins for all the characters in a line and subsequently adjust the intermediate stop-pins for the spaces.

31. In combination with the matrix-bars and stop-pins, the laterally-movable adjusting-pin frame K, the rack-bar V, the slides $t'$ therein, the shaft provided with the pinion and the two escape-wheels $k'$ $r'$, the detent $e'$, the lever $u'$, to project the slides rearward, the arm $l'$, to restore the slides and engage the detent-wheel $r'$, and devices, substantially as described, connecting the lever $u'$ with the spacing-bar U, and the arm $l'$ with the space-keys, as described, whereby the operator is enabled at will to set the machine for the use of spaces of any desired width.

32. In combination with the matrix-bars provided with spacing-surfaces, the finger-keys and intermediate mechanism whereby the keys are enabled to arrest the bars with the designated characters or spaces at the aligning-point, the counting or indicating mechanism, substantially as described, to show the aggregate width of the selected characters and spaces, a connection between said mechanism, substantially as described, and those finger-keys which represent characters, and a separate connection, substantially as described, between said indicating mechanism and the independent space-bar U, as described, whereby the aggregate width of the selected characters and intermediate spaces of minimum width may be indicated and the devices adjusted to bring the characters in position previous to adjusting the devices for bringing the spaces in position, so that the operator may effect the spacing or justification of each line after the designation of the characters therein.

33. In combination with the perforated matrix-bars, the aligning-rod arranged to be projected through the series of bars.

34. In combination with the series of perforated matrix-bars, the aligning-rod, and automatic mechanism, substantially such as described and shown, for advancing and retracting the same.

35. The perforated matrix-bars, in combination with the laterally-acting clamp and the aligning-rod attached to one of said clamps, as described.

36. In combination with the perforated matrix-bars, the aligning-rod, and the clamps having the rod attached, the stripper-plate $y^3$, as described and shown, to prevent the bars from moving laterally and biting upon the rod.

37. In combination with the matrix-bars, the aligning-rod, the clamp, and the stripper, the stripper-retracting rod connected with the clamp and having a limited independent motion, as described.

38. In combination with the notched matrix-bars, the aligning-blade arranged to enter the notches, as described.

39. In combination with the perforated and notched matrix-bars, the aligning-rod, the aligning-blade, and automatic mechanism, substantially as described, for advancing the rod and the bar in the order named.

40. In combination with the matrix-bars and finger-keys, and intermediate mechanism, substantially as described, for bringing into action a larger or smaller number of bars, the slide to sustain those bars which are not called into action, and lateral clamping devices acting only on those bars which are in action.

41. The series of independent movable matrix-bars, the head P, to lift said bars to a common height and lower them in unison, the finger-keys to designate the characters, intermediate mechanism, substantially such as described and shown, adjusted by the keys to arrest the descent of the individual bars, and a lateral clamp acting below the points to which the lower ends of the bars are raised by the lifting-head, whereby the clamp is enabled to act upon those bars which are called into action and permitted to pass beneath those bars which are not called into action without acting thereon.

42. The laterally-acting clamps, in combination with the independently-movable matrix-bars, and mechanism, substantially as described, for lifting the bars above the level of the clamps, whereby the clamps are permitted to pass beneath the bars which remain elevated to act upon those which have been called into use.

43. In a machine for producing printing-bars, the combination, substantially as described and shown, of a changeable matrix composed of independent movable lines or series of intaglio characters and a casting mechanism to co-operate with the selected and aligned characters, whereby the matrix may be caused to present any desired characters in line and a cast be then taken of all the aligned characters at a single operation.

44. In a machine for producing printing-bars, the combination, substantially as hereinbefore described and shown, of the series of independently-movable matrix-bars, the series of finger-keys to designate the characters, the stop mechanism, substantially as described, actuated by the keys to arrest the individual bars with their designated characters in a common line, the mold extending transversely across the series of bars, and the mechanism for supplying the mold with molten metal.

45. The mold, in combination with the series of matrix-bars to close the same on one side and the melting-pot having a delivery-mouth to close the same on the opposite side.

46. In a machine for producing printing-bars, the combination, substantially as hereinbefore described and shown, of the independently-movable matrix-bars, the finger-keys to designate the characters, the intermediate stop mechanism, substantially as described, connected with the keys to arrest the motion of the individual bars, the clamps to hold the adjusted bars, the mold extending across the bars, and the melting-pot and force-pump, said members organized for joint operation, as described.

47. In a machine for producing stereotype-bars, the combination, substantially as hereinbefore described, of the changeable or convertible matrix, the mold co-operating therewith, and appliances, substantially such as shown, for melting metal and forcing the same into the mold.

48. The matrix-bars, in combination with the clamping-bar across their rear edges, the sectional mold across their front edges, the 49. In combination with the movable melting-pot and movable clamping-bar A', the intermediate matrix-bars, and mechanism, substantially such as shown, to close said members against the bars.

50. The matrix-bars, the sliding clamping-bar, the movable melting-pot, combined with the levers and links connecting the clamp and pot, as shown.

51. In combination with the matrix-bars, the clamping-bar A', the aligning-bar mounted therein, and the actuating devices, substantially as described, whereby the aligning-bar is advanced previous to the advance of the clamp.

52. The separable sliding mold, as described, having one of its parts provided with the longitudinal rib to prevent lateral displacement of the casting and with the stud to carry the casting endwise as the mold is opened.

53. In combination with the mold having the sliding top, the ejector $e^4$, to detach the casting therefrom.

54. In combination with the two-part separable mold, as described, the vibrating ejector $e^4$, to detach the cast from the open mold, and the reciprocating rod to deliver the detached cast in an endwise direction.

55. In combination with the matrix-bars, the shouldered mold-sections, and the clamps $o^3 p^3$, connected to said sections, whereby the width of the assembled matrix-bars is caused to determine the length of the mold.

56. In a machine for the production of printing-bars, the combination, with automatic driving mechanism, substantially as described, of the independently-movable matrix-bars, the finger-keys to designate the characters, the stop-pins to arrest the respective bars, devices, substantially such as shown, connected with the keys to set the stop-pins, the mold, the melting-pot, and force-pump, and the movable frame whereby the stop-pins, previously adjusted by the key connections, are first moved into position to arrest the bars, and subsequently restored to their original positions, whereby the casting of one bar and the designation of the characters for another one are permitted to take place at the same time.

57. In combination with the matrix-bars and the clamping-bar A', movable to and from the same, the lateral clamps mounted on slides on the bar A', as shown.

58. In combination with the melting-pot, the movable mold-section provided with a wiper to traverse the mouth or delivery port of the pot.

59. In combination with the movable mold-section adapted, as described, to carry the cast, the fixed knife to dress the edge of the cast, whereby the casts are rendered uniform in height and straight on the base.

60. In combination with the matrix-bars, the pivoted melting-pot provided with the face to close the mold, and with the delivery-orifice in said face, and mechanism, substantially as described, to effect the rocking motion, whereby it is caused to serve the additional purpose of a clamp to hold the bars in position.

61. In combination with the laterally-movable pin-frame K, the indicating mechanism, and the stop-pin frame movable forward and backward, the hand-lever M, connected therewith by means, substantially as described, whereby the various parts may be instantly restored to their initial positions to permit the commencement of a new line in the event of an error having been committed.

62. In combination with the indicator-rod $g^2$ and dogs $f^2 j^2$, the striker provided with arms to trip the dogs, the detent $r^2$, and the slide $q^2$, having inclined surfaces to trip the detent and striker and subsequently reset the striker.

63. In combination with a mold open on two sides, a series of movable matrices grouped in line against one side of the mold, a pot or reservoir acting against the opposite side of the mold, and a pump to deliver the molten or plastic material into the mold, as described and shown.

64. In combination with the matrix-bars, mold, and melting-pot, the finger-keys to designate the characters, the stop mechanism, substantially as described, between the keys and bars to arrest the motion of the latter, the dogs to sustain the adjusted bars independently of the stop mechanism, and the automatic mechanism, substantially as described, for moving the adjusted stops into the path of the bars, and subsequently restoring them to their normal position, whereby the two operations of forming one bar and designating the characters for another may be carried on simultaneously.

65. The matrix-bar having therein transverse grooves with intaglio characters in the bottom, said grooves being of uniform width at the edge of the bar, but of different widths at the bottom corresponding to the heights of the respective characters.

66. In combination with the adjusting-pins J, terminating in different vertical planes, the crank-shafts L, arranged in two vertical rows, as described.

67. The series of bars provided with spacing-surfaces of different widths, in combination with stops, substantially as described, adapted to arrest the bars with any one of the spaces at the aligning-point, whereby the particular space to appear in the line may be positively determined.

68. A series of independently-reciprocating bars each provided with a series of characters and a series of spacing-surfaces, in combination with a series of stop-pins for each bar, one for each character, and one for each space, substantially as described and shown, whereby each bar may be positively stopped to present a character or a space at a point of alignment to the series.

69. The combination of the series of parallel matrix-bars, and the mold having its parts mounted, substantially as described, to move transversely of the bars, whereby the removal of the casting is facilitated.

70. In combination with the elongated mold, the series of independent matrix-bars lying transversely across the face of the mold, and a clamp or pressure device, substantially as described, to urge the bars edgewise toward the mold, whereby they may be released for adjustment and then clamped tightly to the mold.

In testimony whereof I hereunto set my hand in the presence of two attesting witnesses.

OTTMAR MERGENTHALER.

Witnesses:
M. RABENAU,
JULIEN P. FRIEZ.